United States Patent
Takase et al.

(10) Patent No.: US 7,645,810 B2
(45) Date of Patent: Jan. 12, 2010

(54) FOAMED SHEET OF POLYLACTIC ACID RESIN, FOAM MOLDING OF POLYLACTIC ACID RESIN AND METHOD OF PREPARING FOAM MOLDING

(75) Inventors: Kenichi Takase, Kanuma (JP); Takashi Kawada, Kanuma (JP); Akira Iwamoto, Kanuma (JP)

(73) Assignee: JSP Corporation (JP)

( * ) Notice: Subject to any disclaimer, the term of this patent is extended or adjusted under 35 U.S.C. 154(b) by 484 days.

(21) Appl. No.: 11/305,045

(22) Filed: Dec. 19, 2005

(65) Prior Publication Data

US 2007/0141286 A1    Jun. 21, 2007

(51) Int. Cl.
*C08J 9/00* (2006.01)
*C08J 9/12* (2006.01)
*B65D 1/02* (2006.01)

(52) U.S. Cl. .................. 521/98; 521/131; 521/182; 521/189

(58) Field of Classification Search .................. 521/98, 521/131, 182, 189
See application file for complete search history.

(56) References Cited

U.S. PATENT DOCUMENTS 5,134,171 A * 7/1992 Hammel et al. ............... 521/98

FOREIGN PATENT DOCUMENTS

| | | | |
|---|---|---|---|
| EP | 1378538 | * | 1/2004 |
| EP | 1 887 044 | | 2/2008 |
| JP | 2000-136259 | | 5/2000 |
| JP | 2002-003709 | | 1/2002 |
| JP | 2002-322309 | | 11/2002 |
| JP | 2004359910 A | * | 12/2004 |
| JP | 2005145058 A | * | 6/2005 |
| WO | WO 2008/057214 | | 5/2008 |

* cited by examiner

*Primary Examiner*—Irina S Zemel
(74) *Attorney, Agent, or Firm*—Bacon & Thomas, PLLC

(57) ABSTRACT

A foamed sheet of a base resin containing 50 to 100% by weight of a polylactic acid resin and having an apparent density of 63 to 630 kg/m³, a thickness of 0.5 to 7 mm and endothermic and exothermic calorific values of $\Delta H_{endo:2}$ and $\Delta H_{exo:2}$, respectively, as measured by heat flux differential scanning calorimetry at a heating rate of 2° C./min. The endothermic calorific value $\Delta H_{endo:2}$ is at least 10 J/g and the difference ($\Delta H_{endo:2} - \Delta H_{exo:2}$) between the endothermic calorific value $\Delta H_{endo:2}$ and the exothermic calorific value $\Delta H_{exo:2}$ is less than 40 J/g. A foam molding such as a receptacle is prepared by thermoforming the foamed sheet.

13 Claims, 7 Drawing Sheets

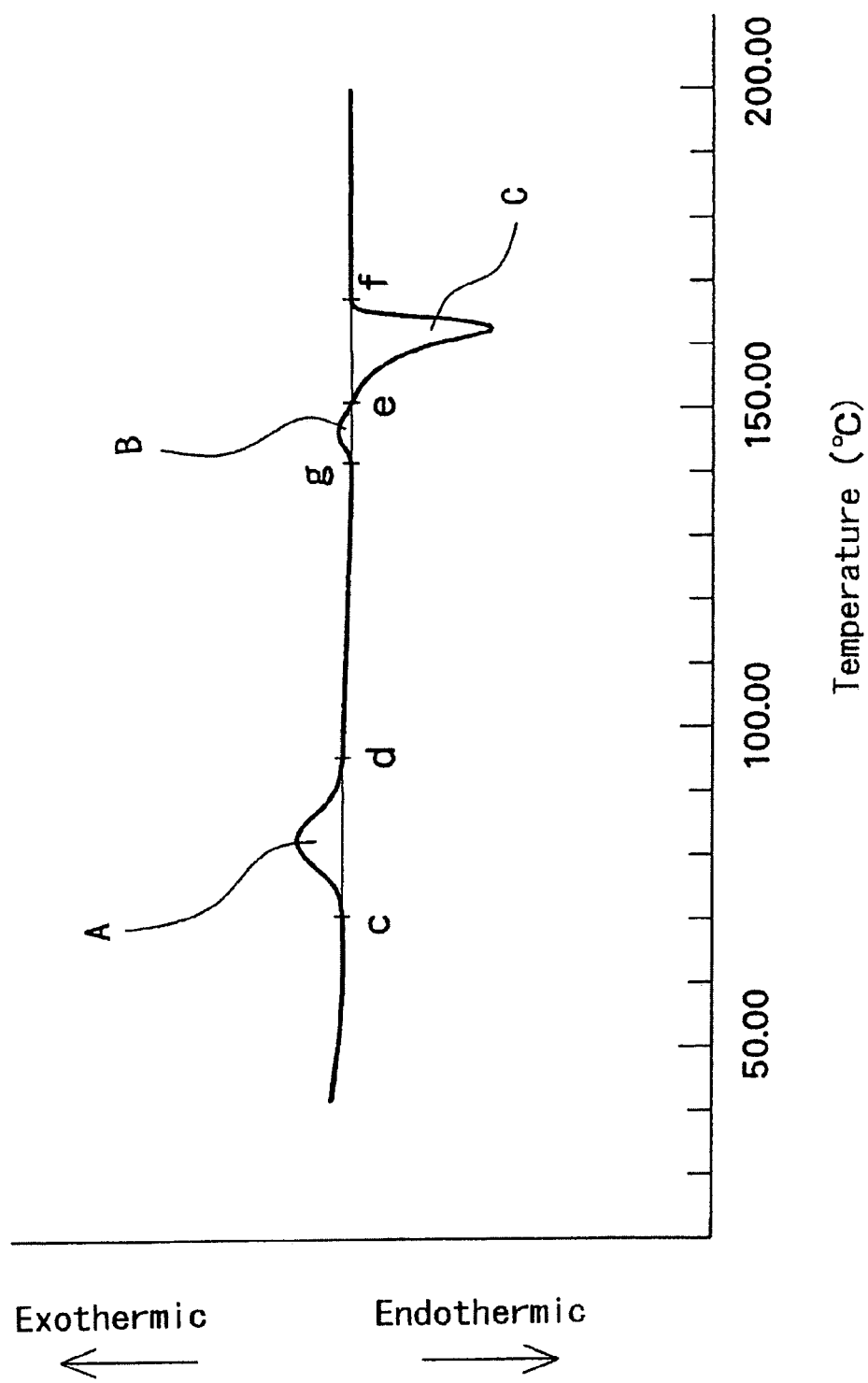

FOAMED SHEET OF POLYLACTIC ACID RESIN, FOAM MOLDING OF POLYLACTIC ACID RESIN AND METHOD OF PREPARING FOAM MOLDING

BACKGROUND OF THE INVENTION

1. Field of the Invention

This invention relates to a foamed sheet of a base resin containing a polylactic acid resin as its major component, to a foam molding of such a polylactic acid resin-containing base resin and to a method of preparing a foam molding by thermoforming such a foamed sheet.

2. Description of Prior Art

Foamed bodies of generally employed resins such as polyethylene, polypropylene and polystyrene resins are now used in various fields because of their good heat insulating properties, cushioning properties and lightness in weight. These foam moldings, which are generally stable, remain in our environment when disposed of and cause environmental problems.

To cope with this problem, many studies are being made on polymers which are decomposable by microorganisms. Among various biodegradable polymers, polylactic acid resins have actually used as, for example, surgical suture materials. Polylactic acid resins are promising because they are safe to human bodies, because they are decomposable, when left in the environment, by hydrolysis and by biological degradation and because their starting material, lactic acid, can be prepared with a high yield at a low cost by fermentation of biomass such as corn. In particular, environmentally friendly foamed bodies such as foamed sheets of a polylactic acid resin are now being developed.

For example, Japanese Unexamined Patent Publication No. JP-A-2002-322309 discloses a foamed sheet of a non-crystalline polylactic acid resin. While the sheet is obtainable with ease by extrusion, the heat resistance thereof is poor. Japanese Unexamined Patent Publications Nos. JP-A-2000-136259 and JP-A-2002-3709 disclose a foamed sheet of a crystalline polylactic acid resin. While the crystalline polylactic acid resin has good heat resistance, it is difficult to obtain a foamed sheet because of poor moldability and poor foamability. Moreover, the foamed sheet obtained has poor thermofoamability because of a high apparent density, non-uniform cell shapes and a low closed cell content.

SUMMARY OF THE INVENTION

It is, therefore, an object of the present invention to provide a foamed sheet of a polylactic acid resin which has both good heat resistance and good thermoformability.

Another object of the present invention is to provide a foam molding obtained by thermoforming a foamed sheet of a polylactic acid resin.

It is a further object of the present invention to provide a method of producing a foam molding using a foamed sheet of a polylactic acid resin.

In accomplishing the above objects, there is provided in accordance with the present invention a foamed sheet of a base resin comprising at least 50% by weight of a polylactic acid resin, said foamed sheet having an apparent density of 63 to 630 kg/m$^3$, a thickness of 0.5 to 7 mm and endothermic and exothermic calorific values of $\Delta H_{endo:2}$ and $\Delta H_{exo:2}$, respectively, as measured by heat flux differential scanning calorimetry at a heating rate of 2° C./min, wherein the endothermic calorific value $\Delta H_{endo:2}$ is at least 10 J/g and the difference ($\Delta H_{endo:2} - \Delta H_{exo:2}$) between the endothermic calorific value $\Delta H_{endo:2}$ and the exothermic calorific value $\Delta H_{exo:2}$ is less than 40 J/g.

In another aspect, the present invention provides a foam molding obtained by thermoforming a foamed sheet of a base resin containing at least 50% by weight of a polylactic acid resin, said foam molding having endothermic and exothermic calorific values of $\Delta H_{endo:Mold}$ and $\Delta H_{exo:Mold}$, respectively, as measured by heat flux differential scanning calorimetry at a heating rate of 2° C./min, wherein the difference ($\Delta H_{endo:Mold} - \Delta H_{exo:Mold}$) between the endothermic calorific value $\Delta H_{endo:2}$ and the exothermic calorific value $\Delta H_{exo:Mold}$ is not less than 10 J/g.

The present invention also provides a method of producing an open-topped foam receptacle having a draw ratio of S2/S1 where S1 represents an area of the top opening thereof and S2 represents an inside surface area thereof, comprising thermoforming in a mold a foamed sheet of a base resin containing at least 50% by weight of a polylactic acid resin, said foamed sheet having an apparent density of 63 to 630 kg/m$^3$, a thickness of 0.5 to 7 mm and endothermic and exothermic calorific values of $\Delta H_{endo:2}$ and $\Delta H_{exo:2}$, respectively, as measured by heat flux differential scanning calorimetry at a heating rate of 2° C./min, wherein the endothermic calorific value $\Delta H_{endo:2}$ is at least 10 J/g and wherein the draw ratio S2/S1 and the difference $\Delta H_x$ ($\Delta H_x = \Delta H_{endo:2} - \Delta H_{exo:2}$) between the endothermic calorific value $\Delta H_{endo:2}$ and the exothermic calorific value $\Delta H_{exo:2}$ satisfy the following equation:

$$S2/S1 \leq -0.08 \Delta H_x + 4.2.$$

BRIEF DESCRIPTION OF THE DRAWINGS

Other objects, features and advantages of the present invention will become apparent from the detailed description of the invention which follows, when considered in the light of the accompanying drawings, in which:

FIG. 7 is a further example of a DSC curve similar to FIG. 5; and

DETAILED DESCRIPTION OF THE PREFERRED EMBODIMENTS OF THE INVENTION

Figure 1:
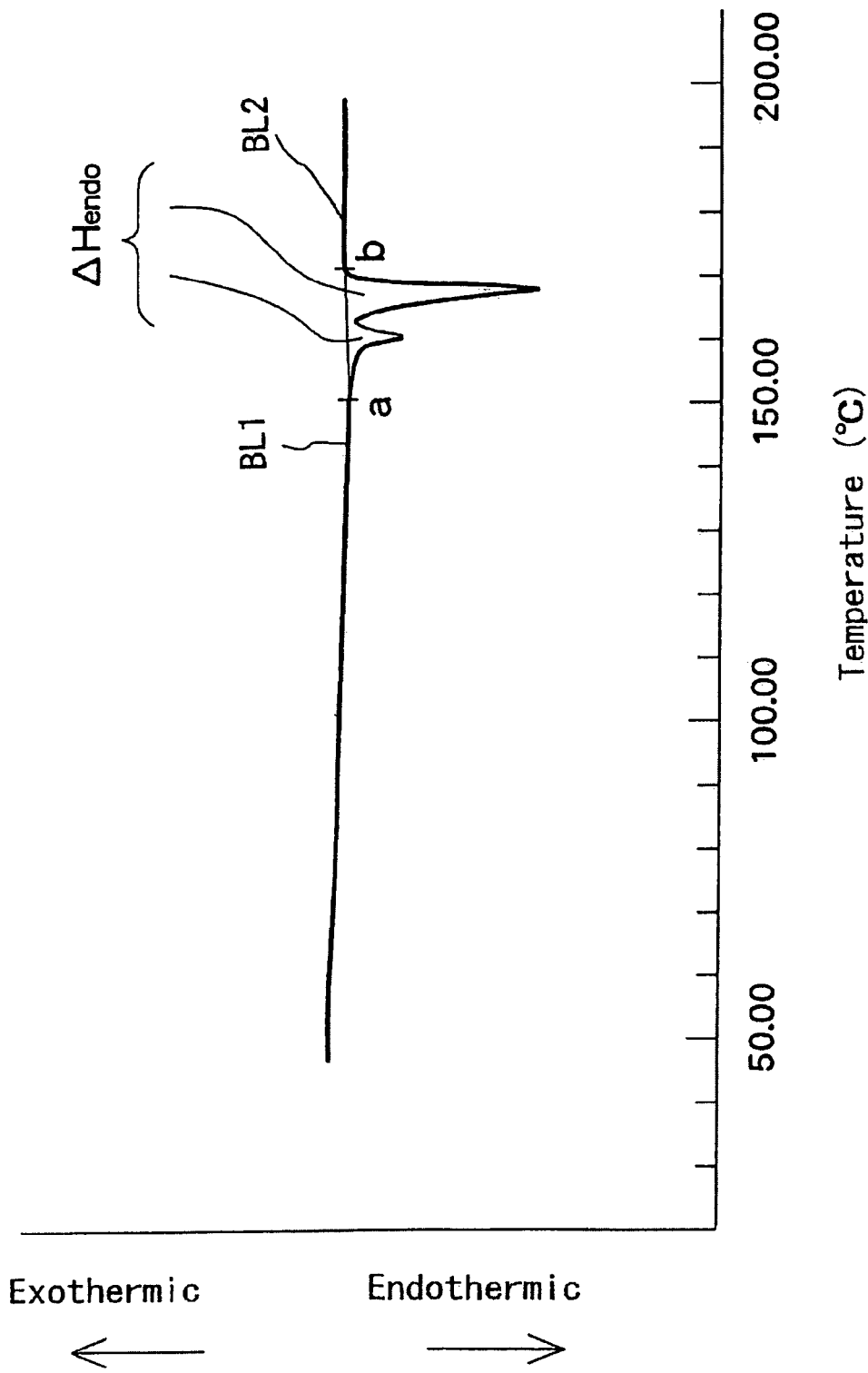
FIG. 1 is an example of a DSC curve of a polylactic acid resin as measured with a heat flux differential scanning calorimeter, explanatory of a method of determining an endothermic calorific value of a polylactic acid resin.

The foamed sheet according to the present invention comprises a base resin containing at least 50% by weight of a polylactic acid resin. The term "polylactic acid resin" as used herein is intended to refer to a polymer or copolymer containing at least 50 mol % of lactic acid monomer component units. Examples of the polylactic acid resin include (a) a homopolymer of lactic acid, (b) a copolymer of lactic acid with one or more aliphatic hydroxycarboxylic acids other than lactic acid, (c) a copolymer of lactic acid with an aliphatic polyhydric alcohol and an aliphatic polycarboxylic acid, (d) a copolymer of lactic acid with an aliphatic polyhydric alcohol, (e) a copolymer of lactic acid with an aliphatic polycarboxylic acid, and (f) a mixture of two or more of (a)-(e) above.

The term "lactic acid" as used herein is intended to refer to L-lactic acid, D-lactic acid, DL-lactic acid, a cyclic dimer thereof (i.e. L-lactide, D-lactide or DL-lactide) or a mixture thereof.

The polylactic acid resin preferably has an endothermic calorific value (heat of fusion) $\Delta H_{endo:Material}$, as measured by heat flux scanning differential calorimetry, of at least 10 J/g, more preferably at least 20 J/g, most preferably at least 30 J/g. The upper limit of the endothermic calorific value is not specifically limited but is generally about 60 J/g. The polylactic acid resin having an endothermic calorific value $\Delta H_{endo:Material}$ of at least 10 J/g may be, for example, a crystalline polylactic acid resin or a mixture of crystalline and non-crystalline polylactic acid resins.

The term "crystalline polylactic acid resin" as used herein is intended to refer to a polylactic acid resin having $\Delta H_{endo:Material}$ of more than 2 J/g. The crystalline polylactic acid resin generally has $\Delta H_{endo:Material}$ of 20-65 J/g. The term "non-crystalline polylactic acid resin" as used herein is intended to refer to a polylactic acid resin having $\Delta H_{endo:Material}$ of 2 J/g or less, or a polylactic acid resin which shows no endothermic peak in heat flux scanning differential calorimetry.

The term "endothermic calorific value $\Delta H_{endo:Material}$" as used herein is intended to refer to heat of fusion as determined from DSC curve of heat flux differential scanning calorimetry in accordance with JIS K7122-1987. The DSC measurement is carried out as follows. A polylactic acid resin sample (about 1 to 4 mg) is charged in a pan of a differential scanning calorimeter and heated to a temperature higher by about 30° C. than the temperature at which the endothermic peak meets the base line to melt the sample. After maintaining the sample at that temperature for 10 minutes, the sample is cooled to 125° C. at a cooling rate of 2° C./minute. The sample is maintained at 125° C. for 120 minutes and then cooled to 40° C. at a cooling rate of 2° C./minute. After the above-described pretreatment, the DSC curve is measured while heating the sample again at 2° C./minute to a temperature higher by about 30° C. than the temperature at which the endothermic peak ends.

Figure 2:
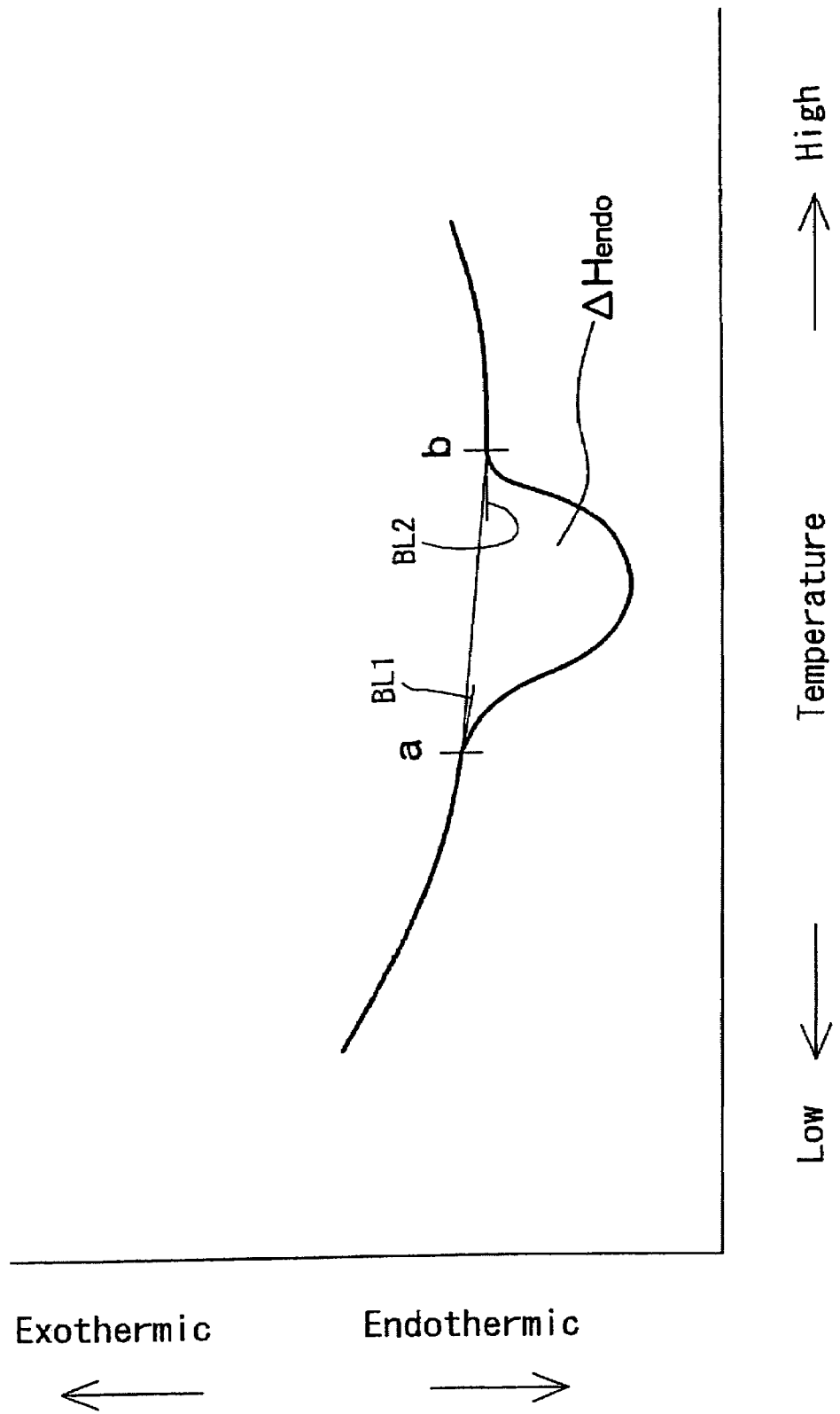
FIG. 2 is an another example of a DSC curve similar to FIG. 1.

FIG. 1 depicts an example of such a DSC curve. In FIG. 1, there are dual endothermic peaks which begin from a point "a" where the DSC curve begins separating from a low temperature-side base line BL1 and which terminates at a point "b" where the DSC curve returns to a high temperature-side base line BL2. The endothermic calorific value $\Delta H_{endo:Material}$ is an integration of the endothermic peak area, namely the area defined by a line passing the points "a" and "b" and the endothermic curve. The DSC device should be preferably operated so that each of the base lines BL1 and BL2 is straight as shown in FIG. 1. When the base line or lines are inevitably curved, the points "a" and "b" are determined as follows. For example, when the base lines BL1 and BL2 are curved as shown in FIG. 2, the curved base line BL1 is extended to the high temperature side with the radius of the curvature of the base line being maintained. The point at which the DSC curve begins separating from the curved base line BL1 is the point "a". Similarly, the point "b" is a point where the DSC curve returns to a curved base line BL2 on the high temperature-side.

The above-described pretreatment is carried out for the purpose of crystallizing the polylactic acid resin sample as much as possible. Thus, the endothermic calorific value $\Delta H_{endo:Material}$ obtained represents a calorific value of the completely or nearly completely crystallized polylactic acid resin. Further, the above-described DSC measurement employs a heating rate of 2° C./minute. The heating rate of 2° C./minute is suitable for separating the endothermic peak and exothermic peak in the DSC curve and for obtaining accurate endothermic calorific value $\Delta H_{endo:Material}$.

As described above, the base resin from which the foamed sheet of the present invention is composed contains at least 50% by weight of a polylactic acid resin. Thus, the base resin may be composed only of the polylactic acid resin or composed of a mixture of the polylactic acid resin with an additional resin. The amount of the polylactic acid resin in the mixture is at least 50% by weight, preferably at least 70% by weight, more preferably at least 90% by weight, based on a total weight of the polylactic acid resin and the additional resin.

Examples of the additional resin include a polyethylene resin, a polypropylene resin, a polystyrene resin and a polyester resin. The use of a biodegradable polyester resin containing at least 35 mol % of aliphatic ester component units, such as a polycondensation product of a hydroxyacid other than lactic acid, a ring open polymerization product of a lactone (e.g. polycaprolactone), a polycondensation product of an aliphatic polyhydric alcohol with an aliphatic polycarboxylic acid (e.g. polybutylene succinate, polybutylene adipate, polybutylene succinate adipate and poly(butylene adipate/terephthalate) is preferred.

The polylactic acid resin may be prepared by any suitable known method such as a method in which lactic acid or a mixture of lactic acid and aliphatic hydroxycarboxylic acid is subjected to a dehydration polycondensation (disclosed, for example, in U.S. Pat. No. 5,310,865); a method in which a cyclic dimer of lactic acid (namely lactide) is subjected to ring-open polymerization (disclosed, for example, in U.S. Pat. No. 2,758,987); a method in which a cyclic dimer of an aliphatic hydroxycarboxylic acid (e.g. lactide or glycolide) and ε-caprolactone are subjected to ring-open polymerization in the presence of a catalyst (disclosed, for example, in U.S. Pat. No. 4,057,537); a method in which lactic acid and a mixture of an aliphatic dihydric alcohol and an aliphatic dibasic acid are subjected to dehydration polycondensation (disclosed, for example, in U.S. Pat. No. 5,428,126); a method in which a lactic acid polymer and a polymer of an aliphatic dihydric alcohol and an aliphatic dibasic acid are subjected to condensation in an organic solvent (disclosed, for example, in EP-A-0712880); and a method in which lactic acid is subjected to dehydration polycondensation in the presence of a catalyst, with a step of polymerization in a solid phase being involved during the course of the polycondensation. The above methods may be performed in the presence of a minor amount of an aliphatic polyhydric alcohol (e.g. glycerin), an aliphatic polybasic acid (e.g. butanetetracarboxylic acid) or polyhydric alcohol (e.g. polysaccharide) to obtain a copolymer.

The foamed sheet of the present invention may be prepared as follows. The base resin and an additive such as a cell controlling agent are heated and kneaded in an extruder. A physical blowing agent is then fed under a pressure to the extruder and the mixture is further kneaded. The kneaded mass is then extruded at a suitable temperature through a die, such as a T-die or a circular die, attached to the extruder in the form of a flat or tubular sheet so that the extrudate foams and expands. The extrudate immediately after being extruded is generally rapidly cooled by air or mist spray. A tubular extrudate from the circular die may be hauled and slid over a mandrel of a cooling device. The cooled tubular extrudate is cut in the extrusion direction and opened to obtain a foamed sheet. For reasons of obtaining a foamed sheet with a uniform thickness and a suitable apparent density, the use of a circular die is desirable.

When a non-crystalline polylactic acid resin is extruded and foamed in the customarily employed manner, a foamed sheet of the non-crystalline polylactic acid resin having a low apparent density may be obtained. Such a foamed sheet, which is excluded from the scope of the present invention, shows good thermoformability. However, since the rigidity of the foamed sheet abruptly reduced when heated above the glass transition point thereof, the thermoformed product cannot retain its shape and is ill-suited for practical use. Namely, the heat resistance of the foamed sheet of a non-crystalline polylactic acid resin is unsatisfactory, though the thermoformability thereof is good. In contrast, when a polylactic acid resin having an endothermic calorific value $\Delta H_{endo:Material}$ of at least 10 J/g is used as a base resin of the foamed sheet of the present invention, the foamed sheet shows good thermoformability and gives a thermoformed product having good heat resistance.

When a polylactic acid resin having an endothermic calorific value $\Delta H_{endo:Material}$ of at least 10 J/g is used as a base resin, a difficulty may arise in obtaining a foamed sheet having an apparent density of 63 to 630 kg/m$^3$ and a thickness of 0.5 to 7 mm because the viscoelasticity of the molten, foamable composition containing the base resin is not easily adequately adjusted to a suitable range. For reasons of obtaining sufficient melt tension during extrusion foaming and of avoiding such a difficulty, it is preferred that the base resin used have a melt tension at 190° C. of at least 3 cN, more preferably at least 5 cN, still more preferably at least 8 cN, most preferably at least 10 cN. The upper limit of the melt tension is generally about 40 cN.

Due to thermal hysteresis and shearing force, the melt tension of the base resin tends to reduce when the base resin is subjected to extrusion foaming. Since a great reduction of the melt tension results in a deterioration of the excellent properties of the foamed sheet, excessive heating or shearing force should not be applied to the base resin during extrusion foaming. The foamed sheet of the present invention preferably has a melt tension at 190° C. of at least 2 cN, more preferably at least 3 cN, particularly preferably at least 5 cN. The upper limit of the melt tension is generally about 40 cN.

The melt tension may be measured using Melt Tension Tester II (manufactured by Toyo Seiki Selsaku-Sho, Ltd.) having a cylinder and a nozzle with an orifice diameter of 2.095 mm and a length of 8 mm. The cylinder and orifice are set at a temperature of 190° C. A specimen (base resin or ground foamed sheet) is charged into a cylinder and held therein for 5 minutes. The melt is then extruded in the form of a string under conditions including a resin temperature of 190° C. and a piston speed of 10 mm/minute from the orifice. The extruded resin string is put on a tension-detecting pulley having a diameter of 45 mm and is taken up on a roller having a diameter of 50 mm while increasing the take-up speed at a rate of about 5 rpm/sec (take-up acceleration of the resin string: $1.3 \times 10^{-2}$ m/sec$^2$). During the extrusion, care should be taken to avoid intrusion of bubbles in the string.

Figure 3:
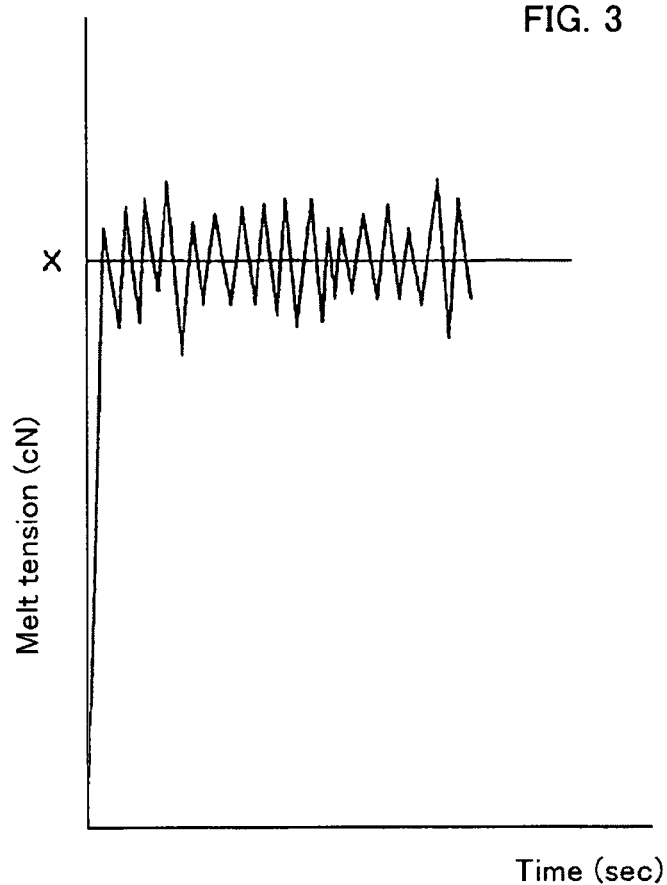
FIG. 3 is a graph explanatory of a method of determining the melt tension of a base resin or a foamed sheet.

The take-up speed is increased until the string put on the pulley breaks. The take-up speed R (rpm) when the string breaks is measured. Then, the string is taken up at a constant speed of 0.7×R (rpm) while measuring the melt tension of the string over time using a detector connected to the tension-detecting pulley. The results are plotted on a chart with the measured melt tension as ordinate and the time as abscissa to obtain a graph as shown in FIG. 3. The melt tension of the specimen herein is the median value (X) of the amplitudes in the stable portion of the graph in FIG. 3. An abnormal amplitude which might be appear in the graph on rare occasion should be ignored in obtaining the median value. In the above procedures, when the resin string does not break up to the take-up speed of 500 rpm, then the melt tension is measured at a take-up speed of 500 rpm rather than 0.7×R (rpm).

It is also preferred that the base resin for the formation of the foamed sheet have a melt flow rate (MFR) of 0.1 to 10 g/10 min, more preferably 0.1 to 5 g/10 min, still more preferably 0.3 to 3 g/10 min, for reasons good extrusion moldability and good thermoformability of the foamed sheet obtained. As used herein, the melt flow rate is as measured in accordance with JIS K7210-1976, Test Method A, at a temperature of 190° C. and a load of 21.2 N.

A polylactic acid resin having a melt tension of at least 3 cN and MFR of 0.1 to 10 g/10 min may be suitably obtained by, for example, a method in which a raw material polylactic acid resin having a melt tension of less than 3 cN (excluding 0 cN) and MFR of 2 to 12 g/10 min is reacted with an organic peroxide to slightly crosslinking the resin (the gel fraction is substantially 0) to obtain a modified polylactic acid resin, or a method in which the raw material polylactic acid resin is reacted with a agent for increasing the molecular weight thereof, such as an isocyanate, an epoxy compound, a metal complex, a polyvalent carboxylic acid or a mixture thereof, to obtain a modified polylactic acid resin.

The organic peroxide used for modifying a polylactic acid resin preferably has a 1 min half life temperature Th (the temperature at which the amount of the active oxygen of the organic peroxide decreases to half when the peroxide is heated at that temperature for 1 minute) which is higher than the melting point Mp of the polylactic acid resin minus 10° C. (Th>Mp−10° C.). When the 1 minute half life temperature Th is lower by 10° C. or more than the melting point Mp (Th≦Mp−10° C.), the organic peroxide will decompose and react before the organic peroxide is uniformly mixed with the polylactic acid resin during the heating and kneading and, therefore, the resin cannot be uniformly modified. Additionally, since the organic peroxide needs to be used in an increased amount, crosslinking tends to proceeds excessively in the succeeding extrusion foaming step so that the gel fraction of the foamed sheet undesirably increases. On the other hand, when Th is considerably higher than Mp, it is necessary to carry out the modification at a high temperature. This may cause degradation of the molecular weight of the polylactic acid resin and deterioration of the properties of the foamed sheet. For this reason, Th is desirably not higher than Mp plus 20° C. (Th≦Mp+20° C.).

As used herein, the term "melting point" of the polylactic acid resin is intended to refer to a temperature of the apex of the endothermic peak in a DSC curve obtained by heat flux differential scanning calorimetry in accordance with JIS K7121-1987. More specifically, a test piece is heat treated under the condition specified in "3. Condition Adjustment (2)" (a cooling rate of 10° C./min is used). The condition-adjusted test piece is then subjected to DSC analysis at a heating rate 10° C./min to obtain an endothermic peak. When two or more endothermic peaks are present, the temperature of the peak having the largest area represents the melting point.

Examples of suitable organic peroxides are shown below together with 1 min half life temperature indicated in the brackets: isobutylperoxide [85° C.], cumyl peroxy neodecanoate [94° C.], α,α'-bis(neodecanoylperoxy)diisopropylbenzene [82° C.], di-n-propyl peroxydicarbonate [94° C.], diisopropyl peroxydicarbonate [88° C.], 1-cyclohexyl-1-methylethyl peroxy neodecanoate [94° C.], 1,1,3,3-tetramethylbutyl peroxy neodecanoate [92° C.], bis(4-t-butylcyclohexyl) peroxydicarbonate [92° C.], di-2-ethoxyethyl peroxydicarbonate [92° C.], di(2-ethylhexylperoxy)dicarbonate [91° C.], t-hexyl peroxy neodecanoate [101° C.], dimethoxybutyl peroxydicarbonate [102° C.], di(3-methyl-3-methoxybutylperoxy)dicarbonate [103° C.], t-butyl peroxy neodecanoate [104° C.], 2,4-dichlorobenzoyl peroxide [119° C.], t-hexyl peroxy pivalate [109° C.], t-butyl peroxy pivalate [110° C.], 3,5,5-trimethylhexanoyl peroxide [113° C.], octanoyl peroxide [117° C.], lauroyl peroxide [116° C.], stearoyl peroxide [117° C.], 1,1,3,3-tetramethylbutyl peroxy 2-ethylhexanoate [124° C.], succinic peroxide [132° C.], 2,5-dimethyl-2,5-di(2-ethylhexanoylperoxy)hexane [119° C.], 1-cyclohexyl-1-methylethyl peroxy 2-ethylhexanoate [138° C.], t-hexyl peroxy 2-ethylhexanoate [133° C.], t-butyl peroxy 2-ethylhexanoate [134° C.], m-toluoyl benzoyl peroxide [131° C.], benzoyl peroxide [130° C.], t-butyl peroxy isobutylate [136° C.], 1,1-bis(t-butylperoxy)-2-methylcyclohexane [142° C.], 1,1-bis(t-hexylperoxy)-3,3,5-trimethylcyclohexane [147° C.], 1,1-bis(t-butylperoxy)-3,3,5-trimethylcyclohexane [149° C.], 1,1-bis(t-hexylperoxy)cyclohexane [149° C.], 1,1-bis(t-butylperoxy)cyclohexane [154° C.], 2,2-bis(4,4-dibutylperoxycyclohexyl)propane [154° C.], 1,1-bis(t-butylperoxy)cyclododecane [153° C.], t-hexyl peroxy isopropyl monocarbonate [155° C.], t-butyl peroxy maleic acid [168° C.], t-butyl peroxy 3,5,5-trimethylhexanoate [166° C.], t-butyl peroxy laurate [159° C.], 2,5-dimethyl-2,5-di(m-toluoylperoxy)hexane [156° C.], t-butyl peroxy isopropyl monocarbonate [159° C.], t-butyl peroxy 2-ethylhexyl monocarbonate [161° C.], t-hexyl peroxy benzoate [160° C.], 2,5-dimethyl-2,5-di(benzoylperoxy)hexane [158° C.] and dicumyl peroxide [175° C.]. Above all, dicumyl peroxide is particularly preferably used. The organic peroxides may be used singly or in combination with two or more thereof. The organic peroxide or peroxides are generally used in an amount of 0.3 to 0.7 part by weight, preferably 0.4 to 0.6 part by weight, per 100 parts by weight of the polylactic acid resin.

The 1 min half life temperature of the organic peroxide is measured as follows. A sample peroxide is dissolved in a suitable solvent inert to radicals, such as benzene or mineral spirit, to obtain a solution having a peroxide concentration of 0.1 mol/L. This is placed in a glass tube whose inside space has been substituted by nitrogen. The glass tube is sealed and immersed in a constant temperature bath maintained at a predetermined temperature for 1 minute to permit the peroxide to decompose. The above procedures are repeated at various temperatures to determine the half life temperature.

The polylactic acid resin thus modified has a gel fraction of substantially zero %. The term "gel fraction" as used herein is as measured by the following method. Sample resin (weight W1; about 1 g) is immersed in 100 ml of chloroform contained in a 150 ml flask and the mixture is refluxed for 10 hours in boiling chloroform at about 61° C. The mixture is then immediately filtered through a 200 mesh wire net using a vacuum filtration device. The solids on the wire net are dried in an oven at 20° C. for 8 hours under a reduced pressure of 30-40 Torr. The dry weight (W2) of the chloroform-insoluble matters left on the wire net is measured. A gel fraction (% by weight) is calculated from the formula:

$$\text{Gel fraction (\%)} = (W2/W1) \times 100$$

The term "gel fraction of substantially zero %" as used herein is intended to refer that the gel fraction is 2% or less. The gel fraction of the modified polylactic acid is preferably 0.5% by weight or less.

The blowing agent used for the production of a foamed sheet having a low apparent density may be an organic physical blowing agent or an inorganic physical blowing agent. Examples of the organic physical blowing agents include aliphatic hydrocarbons such as propane, n-butane, isobutane, n-pentane, isopentane and hexane; and halogenated aliphatic hydrocarbons such as methyl chloride and ethyl chloride. Examples of inorganic physical blowing agents include air, nitrogen and carbon dioxide. Above all, n-butane, isobutane and carbon dioxide are preferred. A chemical blowing agent may be also used, if desired. However, for the production of a foamed sheet having a low apparent density, the use of a physical blowing agent or a mixture of a physical blowing agent and a chemical blowing agent is preferred.

The foamed sheet of the present invention may contain an inorganic cell controlling agent such as talc or silica, or an organic cell controlling agent such as calcium stearate. One or more additives such as a colorant and an anti-oxidant may also be incorporated into the foamed sheet.

The foamed sheet of the present invention has an apparent density of 63 to 630 kg/m$^3$, preferably 84 to 504 kg/m$^3$. Too low an apparent density below 63 kg/m$^3$ is undesirable because the thermoformability of the foamed sheet is so poor that it is impossible to obtain a thermoformed product having a shape conforming to the shape of the mold. Further, the thermoformed product obtained has a low mechanical strength. When the apparent density is higher than 630 kg/m$^3$, the heat insulating property, cushioning property and lightness in weight of the foamed sheet are unsatisfactory.

As used herein, the "apparent density of the foamed sheet" is measured as follows. From the foamed sheet, a square specimen having a length of 10 mm, a width of 10 mm and a thickness equal to that of the foamed sheet is cut and measured for its weight. The apparent density is obtained by dividing the weight of the specimen by the volume thereof.

The foamed sheet has a thickness of 0.5 to 7 mm, preferably 0.5 to 5 mm, more preferably 0.7 to 3 mm. A thickness of the foamed sheet smaller than 0.5 mm is disadvantageous because the mechanical strength of a thermoformed product obtained from the foamed sheet is low. Too large a thickness in excess of 7 mm will deteriorate the thermoformability of the foamed sheet so that a thermoformed product obtained has not uniform thickness.

As used herein, the "thickness of the foamed sheet" is measured as follows. The thickness of the foamed sheet is measured at every 10 mm interval throughout the width thereof (in the direction perpendicular to the extrusion direction). The thickness of the foamed sheet is an arithmetic mean of the measured thicknesses.

It is preferred that the foamed sheet have the following cell geometry:

$0.05 \text{ mm} < Z < 0.8 \text{ mm}$ $0.2 < Z/X < 0.8$ $0.2 < Z/Y < 0.65$ wherein X is an average cell diameter (mm) in the extrusion direction (machine direction) Y is an average cell diameter (mm) in the transverse direction and Z is an average cell diameter (mm) in the thickness direction, because the mechanical strength, thermoformability, flexibility and appearance of the foamed sheet are excellent and because the thermoformed product obtained therefrom has excellent mechanical strength. More preferably, Z is 0.1 to 0.5 mm, Z/X is 0.3 to 0.7 and Z/Y is 0.25 to 0.60.

As used herein the "average cell diameters X, Y and Z" of a foamed sheet are measured as follows.

Figure 4A:
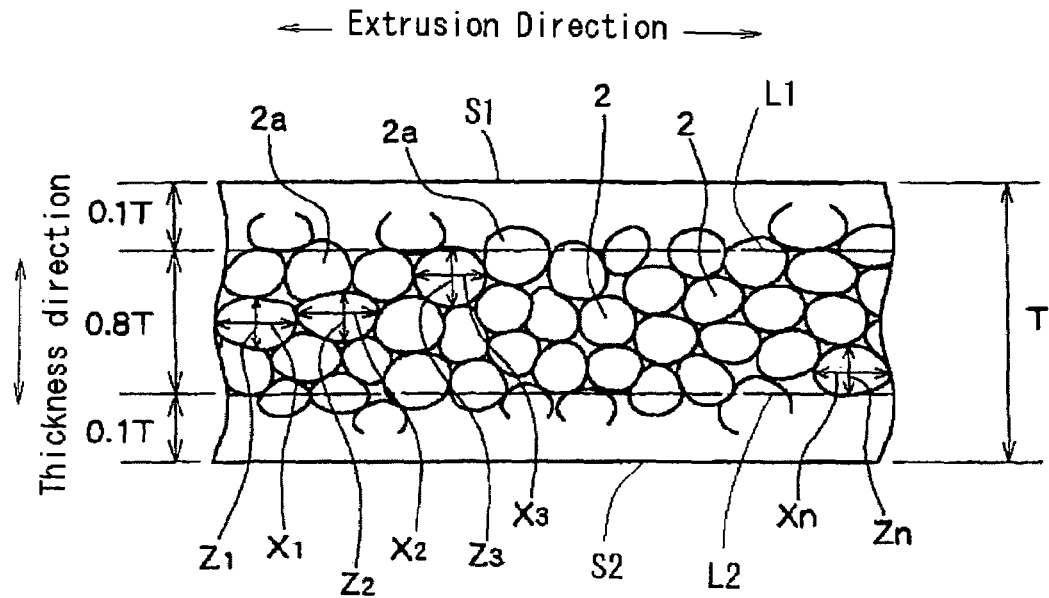
FIG. 4(a) and FIG. 4(b) are sectional views in the extrusion direction and transverse direction, respectively, explanatory of a method of measuring average cell diameters in the extrusion direction, thickness direction and transverse direction of the foamed sheet.

To determine X and Z, the foamed sheet is cut in the extrusion direction and the cross-section is photographed using a microscope. On the photograph, which is diagrammatically shown in FIG. 4(a), a pair of straight lines L1 and L2 are drawn in parallel with the lines S1 and S2 indicating both surfaces of the sheet having a thickness T. The lines L1 and L2 extend at positions spaced apart a distance 0.1 T from the surface lines S1 and S2. Using a caliper, the diameters in the extrusion direction $(x_1, x_2, x_3, \ldots x_n)$ and in the thickness direction $(z_1, z_2, z_3, \ldots z_n)$ of all the cells 2 present in the center region (having a thickness 0.8 T) defined between the lines L1 and L2 over the length 5 T (5 times the thickness of the sheet) are measured. In this case, the cells 2a present on the Lines L1 and L2 are excluded. The arithmetic mean of the measured diameters $(x_1, x_2, x_3, \ldots x_n)$ represents the average cell diameter X in the extrusion direction and the arithmetic mean of the measured diameters $(z_1, z_2, z_3, \ldots z_n)$ represents the average cell diameter Z in the thickness direction.

Figure 4B:
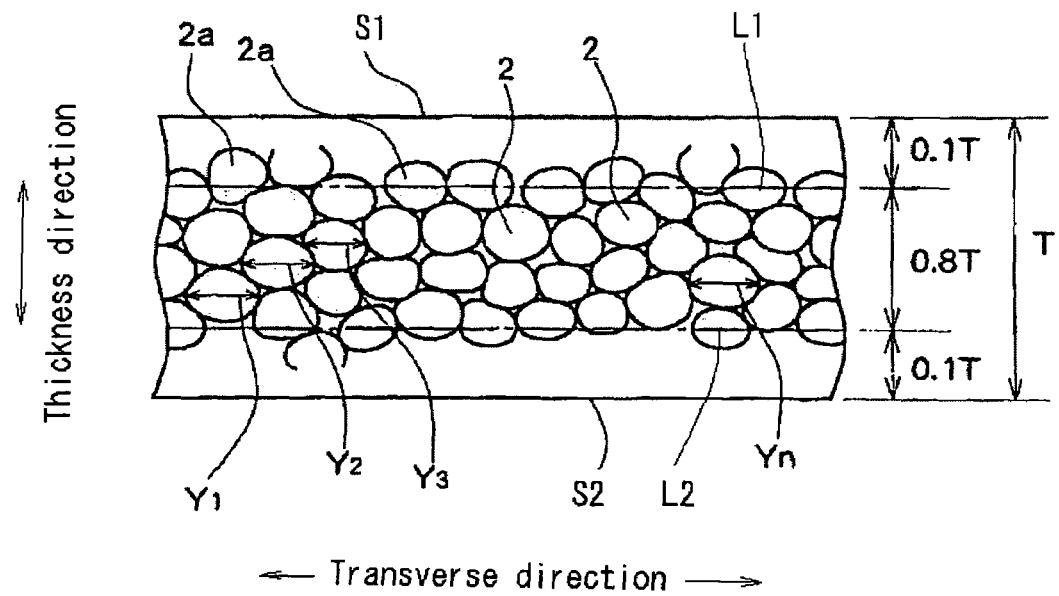

To determine Y, the foamed sheet is cut in the transverse direction and the cross-section is photographed using a microscope. On the photograph, which is diagrammatically shown in FIG. 4(b), a pair of straight lines L1 and L2 are drawn in the same manner as above. The diameters in the transverse direction $(y_1, y_2, y_3, y_n)$ of all the cells 2 present between the lines L1 and L2 over the length 5 T are measured. The arithmetic mean of the measured diameters $(y_1, y_2, y_3, \ldots y_n)$ represents the average cell diameter Y in the transverse direction.

The average cell diameters may be controlled by using an organic or inorganic cell controlling agent such as talc or sodium hydrogen carbonate in an amount of 0.1 to 3 parts by weight per 100 parts by weight of the base resin or by controlling the pressure in the die at the time of extrusion molding. In particular, by increasing the amount of a cell controlling agent within such a range that permits the preparation of a foamed sheet having good appearance and desired apparent density and thickness, the cell size can be made small. The cell size can be also made small by increasing the pressure in the die. The ratio Z/X can be controlled by controlling the hauling speed of the foamed sheet immediately after the extrusion foaming. The ratio Z/Y can be controlled by controlling the spreading ratio in the transverse direction of the foamed sheet immediately after the extrusion foaming.

The foamed sheet of the present invention preferably has a closed cell content of 50 to 100%, more preferably 70 to 100%, and most preferably 80 to 100%, since the foamed sheet has high mechanical strength and exhibits good thermoformability and gives a thermoformed product (foam molding) having high mechanical strength, molding reproducibility and good appearance.

The closed cell content of the foamed sheet is obtained according to Procedure C of ASTM D-2856-70 (reapproved 1976) as follows. The true volume Vx of a specimen of the foamed sheet is measured using Air Comparison Pycnometer Type-930 manufactured by Toshiba Beckmann Inc. The foamed sheet is cut to have a size of 25 mm×25 mm and a thickness equal to that of the foamed sheet. The cutouts are stacked in such a number that the stack has an apparent volume of as near 15 cm³ as possible to obtain the specimen. The closed cell content S (%) is calculated by the following formula:

$$S(\%) = (Vx - W/\rho) \times 100 / (Va - W/\rho)$$

wherein

Vx represents the true volume (cm³) of the specimen measured by the above method, which corresponds to a sum of a volume of the resin constituting the specimen and a total volume of all the closed cells in the specimen;

Va represents the apparent volume (cm³) of the specimen used for the measurement, which is calculated from the outer dimension thereof;

W represents the weight (g) of the specimen used for the measurement; and

ρ represents the density (g/cm³) of the base resin constituting the specimen.

It is important that the foamed sheet of the present invention should have such characteristics in heat flux scanning differential calorimetry (DSC) at a heating rate of 2° C./min that a difference $\Delta H_x$ ($\Delta H_x = \Delta H_{endo:2} - \Delta H_{exo:2}$) between an endothermic calorific value $\Delta H_{endo:2}$ and an exothermic calorific value $\Delta H_{exo:2}$ is less than 40 J/g and that the endothermic calorific value $\Delta H_{endo:2}$ is at least 10 J/g. Namely, the foamed sheet should have a controlled crystallinity so that it has good thermoformability and ability to improve heat resistance and gives a thermoformed product (foam molding) having excellent heat resistance. The crystallinity of the foamed sheet may be controlled by rapidly cooling the extruded and foamed sheet immediately after extrusion with air or mist.

The exothermic peak is attributed to a heat of crystallization, i.e. a heat generated from the sample foamed sheet as a result of the crystallization thereof during the course of heating at a rate of 2° C./minute in the DSC measurement. The exothermic calorific value $\Delta H_{exo:2}$ is the calorific value of the exothermic peak. The greater is the exothermic calorific value $\Delta H_{exo:2}$, the lower is the degree of crystallization of the sample. The endothermic peak is attributed to a heat of fusion, i.e. a heat absorbed by the sample as a result of the fusion of the crystals thereof during the course of heating at a rate of 2° C./minute in the DSC measurement. The endothermic calorific value $\Delta H_{endo:2}$ is the calorific value of the endothermic peak. The greater the endothermic calorific value $\Delta H_{endo:2}$, the greater is the crystallizability of the foamed sheet (therefore, the higher are the rigidity and the ability to improve heat resistance of a foam molding obtained from the foamed sheet). The difference $\Delta H_x$ ($\Delta H_x = \Delta H_{endo:2} - \Delta H_{exo:2}$) represents a calorific value required for fusing the crystals originally contained in the foamed sheet sample before the DSC measurement. The smaller the difference $\Delta H_x$ is, the lower is the degree of crystallization of the foamed sheet before the DSC measurement. Thus, a foamed sheet having $\Delta H_x$ of less than 40 J/g (including 0 J/g) has not a high degree of crystallinity and is excellent in thermoformability. A foamed sheet having $\Delta H_{endo:2}$ of at least 10 J/g can exhibit excellent rigidity and heat resistance when treated, for example, by heat treatment, so as to have an increased degree of crystallinity. When the difference $\Delta H_x$ is 40 J/g or greater, the thermoformability of the foamed sheet is not satisfactory. In particular, it is difficult to thermoform such a foamed sheet into an open-topped foamed receptacle having a large draw ratio of S2/S1 (where S1 represents an area of the top opening thereof and S2 represents an inside surface area thereof) of 1.5 or more, particularly 1.8 or more.

The difference $\Delta H_x$ is preferably 1 to less than 20 J/g, more preferably 2 to 18 J/g, from the standpoint of very excellent deep drawability of the foamed sheet. The difference $\Delta H_x$ is preferably 20 to less than 40 J/g, more preferably 20 to 35 J/g, from the standpoint of improved efficiency of a heat treatment which is conducted for the purpose of improving the heat resistance of the thermoformed product, though the deep drawability is reduced a little.

The endothermic calorific value $\Delta H_{endo:2}$ of the foamed sheet should be at least 10 J/g, since otherwise satisfactory rigidity and heat resistance cannot be obtained even when the foamed sheet is heat treated for increasing the degree of crystallinity. The $\Delta H_{endo:2}$ is preferably at least 20 J/g, more preferably at least 25 J/g, most preferably at least 30 J/g. The upper limit of $\Delta H_{endo:2}$ is not specifically limited but is generally about 60 J/g. The exothermic calorific value $\Delta H_{exo:2}$ of the foamed sheet can be 0 J/g.

As described previously, the exothermic peak is attributed to a heat generated from the sample foamed sheet as a result of the crystallization thereof during the course of heating at a rate of 2° C./minute in the DSC measurement. The greater is the $\Delta H_{exo:2}$ of the exothermic peak, the lower is the degree of crystallization of the sample. From the standpoint of improved heat resistance of the foam molding attained during or after the thermoforming, $\Delta H_{exo:2}$ is desired to be high. Thus, the foamed sheet preferably has $\Delta H_{exo:2}$ of at least 3 J/g, more preferably at least 5 J/g, still more preferably at least 15 J/g, most preferably at least 20 J/g. The upper limit of $\Delta H_{exo:2}$ is not specifically limited but is generally about 60 J/g.

Figure 5:
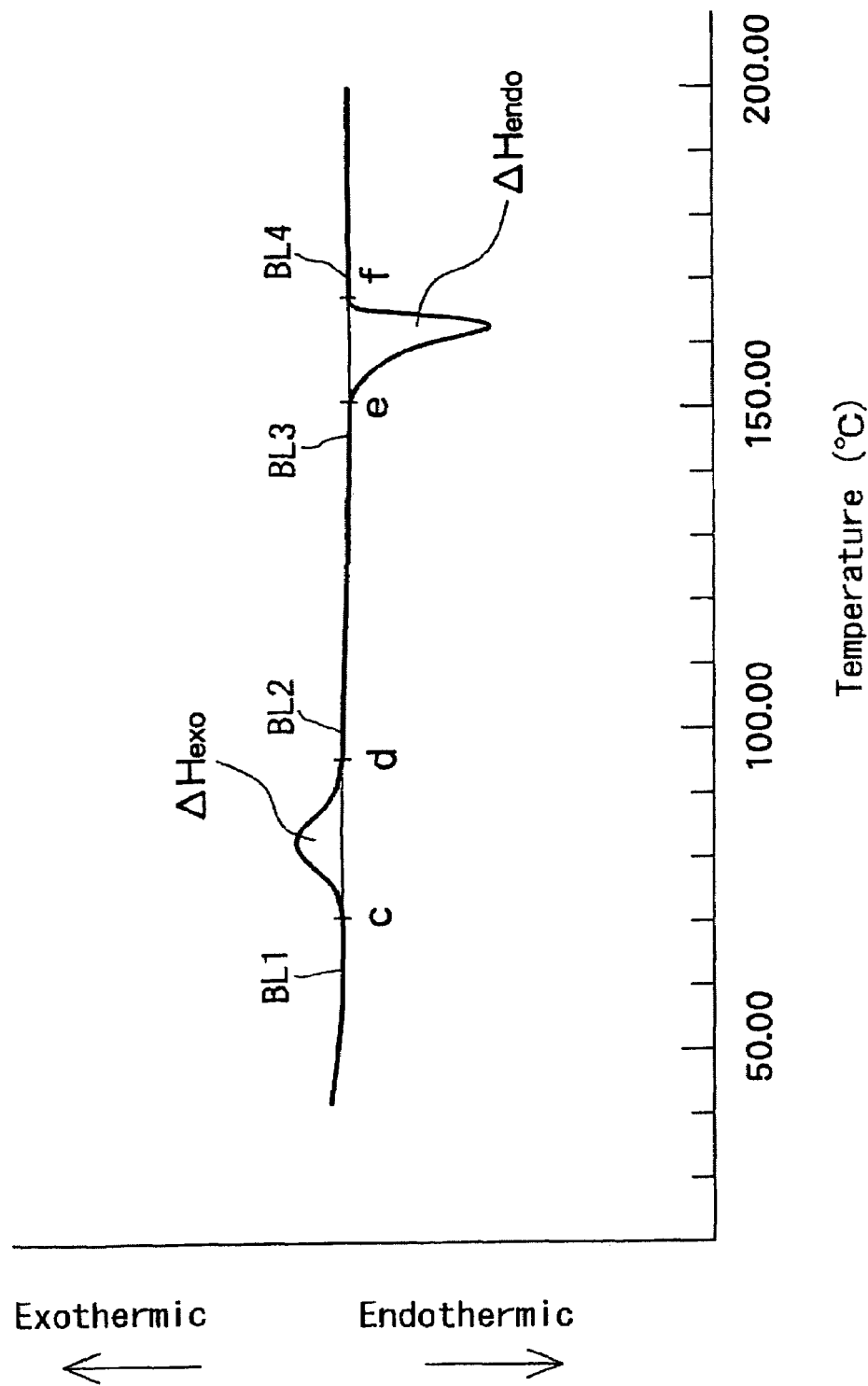
FIG. 5 is an example of a DSC curve of a foamed sheet as measured with a heat flux differential scanning calorimeter, explanatory of a method of determining a calorific value of each of an endothermic peak and an exothermic peak.

The terms "endothermic calorific value $\Delta H_{endo:2}$" and "exothermic calorific value $\Delta H_{exo:2}$" as used herein are determined from DSC curve of heat flux differential scanning calorimetry in accordance with JIS K7122-1987. The DSC measurement is carried out as follows. A sample (about 1 to 4 mg) of a foamed sheet is charged in a pan of a differential scanning calorimeter. Without performing any pretreatment for the adjustment of the conditions of the sample, the DSC curve of the sample is measured while heating the sample at 2° C./minute to a temperature higher by about 30° C. than the temperature at which the endothermic peak meets the base line to melt the sample. FIG. 5 depicts an example of such a DSC curve. In FIG. 5, there is an exothermic peak which begin from a point "c" where the DSC curve begins separating from a low temperature-side base line BL1 and which terminate at a point "d" where the DSC curve returns to a high temperature-side base line BL2. The exothermic calorific value $\Delta H_{exo:2}$ is an integration of the exothermic peak area, namely the area defined by a line passing the points "c" and "d" and the exothermic curve. There is also an endothermic peak which begin from a point "e" where the DSC curve begins separating from a low temperature-side base line BL3 and which terminate at a point "f" where the DSC curve returns to a high temperature-side base line BL4. The endothermic calorific value $\Delta H_{endo:2}$ is an integration of the endothermic peak area, namely the area defined by a line passing the points "e" and "f" and the endothermic curve. The DSC device should be preferably operated so that each of the base lines BL1 through BL4 is straight as shown in FIG. 5. When the base line or lines are inevitably curved, the points "c" to "f" are determined in the same manner as described with reference to FIG. 2. For example, when the base lines BL1 and BL2 are curved, the curved base lines BL1 and BL2 are extended to the high temperature side and low temperature side, respectively, with the radius of the curvature of the base lines being maintained. The point at which the DSC curve begins separating from the curved base line BL1 is the point "c". The point "d" is a point where the DSC curve returns to a curved base line BL2 on the high temperature-side. Similarly, the points "e" and "f" are points where the DSC curve begins separating from the curved base line BL3 and where the DSC curver returns to a curved base line BL4, respectively.

Figure 6:
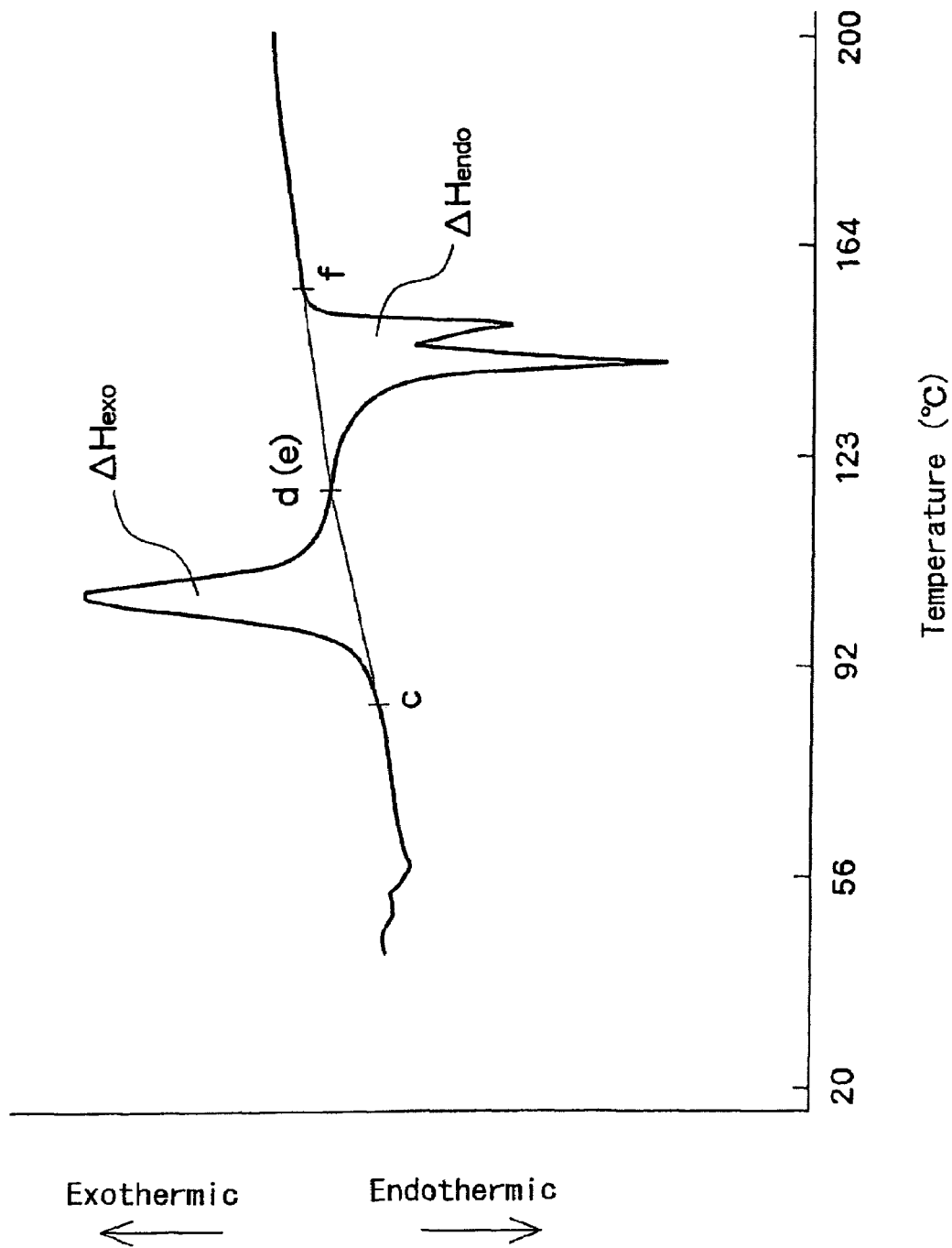
FIG. 6 is an another example of a DSC curve similar to FIG. 5.

When the exothermic and endothermic peaks are not separated from each other as shown in FIG. 6, the points "c" and "f" are first determined in the same manner as that in FIG. 5. Then, the intersection between a line passing the points "c" and "f" and the DSC curve is assigned as point "d(e)". The exothermic calorific value $\Delta H_{exo:2}$ is an area defined by a line passing the points "c" and "d(e)" and the exothermic curve, while the endothermic calorific value $\Delta H_{endo:2}$ is an area defined by a line passing the points "d(e)" and "f" and the endothermic curve.

When there are two or more exothermic and/or endothermic peaks, the exothermic calorific value $\Delta H_{exo:2}$ and/or the endothermic calorific value $\Delta H_{endo:2}$ are each a total of the area of respective peaks. For example, when there are two, first and second exothermic peaks A and B and one endothermic peak C and when the peaks B and C are continuous, as shown in FIG. 7, the exothermic calorific value $\Delta H_{exo:2}$ is a sum of an area defined by a line passing through points "c" and "d" and the first exothermic peak A and an area defined by a line passing through points "g" and "e" and the second exothermic peak B. In this case, the points "c" and "d" are similar to those in FIG. 5, while the points "g" and "e" are similar to the points "c" and "d(e)" in FIG. 6. Thus, the point "e" in FIG. 7 is an intersection between a line passing the points "g" and "f" and the DSC curve. The endothermic calorific value $\Delta H_{endo:2}$ is an area defined by the line passing the points "e" and "f" and the endothermic peak C.

In the above-described heat flux differential scanning calorimetry, a heating rate of 2° C./minute has been found to be suitable for obtaining a DSC curve in which endothermic and exothermic peaks are independently present and for measuring precise endothermic and exothermic calorific values $\Delta H_{endo:2}$ and $\Delta H_{exo:2}$.

It is preferred that the foamed sheet of the present invention have a heat sag of at least 10 mm for reasons of improved thermoformability. As used herein, the "heat sag" is as measured in accordance with JIS K7195-1993. More specifically, from a foamed sheet, a specimen having a length of 125 mm, a width of 10 mm and a thickness of 3 mm is cut out such that at least one side of the specimen is the surface of the foamed sheet. When the thickness of the foamed sheet is less than 3 mm, the thickness of the foamed sheet is the thickness of the specimen. The specimen is fixed to a specimen holder with the surface of the foamed sheet facing upward. The test temperature is 75° C.

It is also preferred that the foamed sheet have an exothermic calorific value $\Delta H_{exo:10}$, as measured by heat flux differential scanning calorimetry at a cooling rate of 10° C./min, of at least 20 J/g, since the crystallization of the foamed sheet can proceed within a short time by a heat treatment. Thus, a foam molding having an excellent heat resistance may be obtained by thermoforming the foamed sheet, followed by the heat treatment. The upper limit of $\Delta H_{exo:10}$ is preferably about 60 J/g, since premature crystallization of the foamed sheet during the extrusion foaming stage can be prevented and since the foamed sheet can be thermoformed with good thermoformability and with a high draw ratio.

Particularly, when the $\Delta H_{exo:10}$ of the foamed sheet is in the range of 20 to 45 J/g, the foamed sheet exhibits a suitable crystallization speed so that the thermoforming of the foamed sheet can be carried out without difficulty even at a high draw ratio and the thermoformed product obtained therefrom can be imparted with a high degree of crystallization and an improved heat resistance by heat treatment. Thus, the $\Delta H_{exo:10}$ is more preferably 20 to 45 J/g, still more preferably 25 to 40 J/g, most preferably 30 to 38 J/g.

The DSC analysis at a cooling rate of 2° C./min cannot properly determine whether or not a given foamed sheet has a crystallization speed suitable both for thermoforming and for heat treating a thermoformed product obtained from the foamed sheet, since crystallization can proceed during the DSC measurement even when the foamed sheet has a low crystallization speed.

The "exothermic calorific value $\Delta H_{exo:10}$" as used herein is a heat of crystallization determined from DSC curve of heat flux differential scanning calorimetry in accordance with JIS K7122-1987. The DSC measurement is carried out in nearly the same manner as that for the above-described measurement of $\Delta H_{endo:2}$ and is as follows. A sample (about 1 to 4 mg) of a foamed sheet is charged in a pan of a differential scanning calorimeter. The sample is heated to a temperature higher by about 30° C. than the temperature at which the endothermic peak meets the base line to melt the sample and maintained at that temperature for 10 minutes. Thereafter, the sample is measured for a DSC curve while cooling the sample at a cooling rate of 10° C./min. The exothermic calorific value $\Delta H_{exo:10}$ is an integration of the exothermic peak area, namely the area defined by a line, which passes the point where the DSC curve begins separating from a high temperature-side base line and the point where DSC curve returns to a low temperature-side base line, and the endothermic curve. The DSC device should be preferably operated so that each of the base lines is straight. When the base line or lines are inevitably curved, the two points are determined in the same manner as described previously.

It is further preferred that the foamed sheet have a half crystallization time (half crystallization time) of 2 to 200 seconds, more preferably 10 to 150 seconds, most preferably 20 to 120 seconds, at 110° C., since the degree of crystallization of a thermoformed product obtained from the foamed sheet can be increased by a short time heat treatment and since premature crystallization of the foamed sheet during the extrusion foaming stage can be prevented so that the foamed sheet can be thermoformed with good thermoformability and with a high draw ratio.

Figure 8:
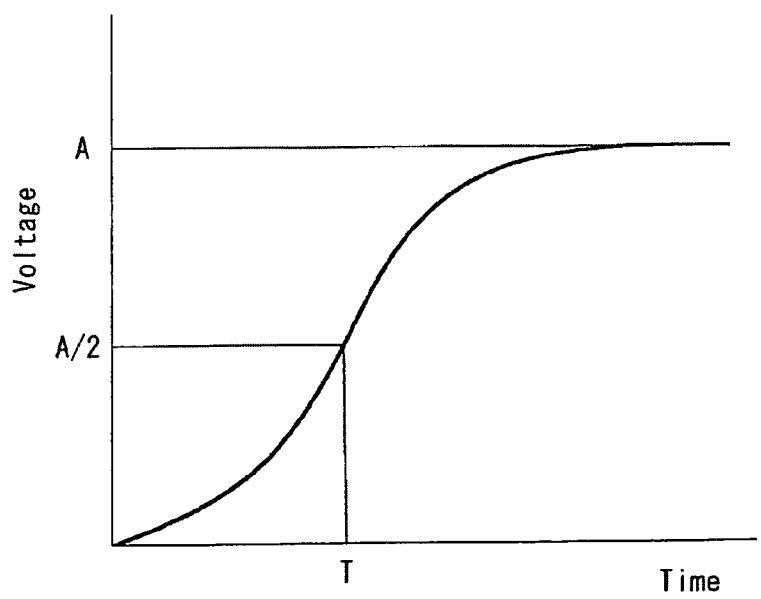
FIG. 8 is a graph explanatory of a method of determining the half crystallization time of a foamed sheet.

The "half crystallization time" as used herein is as measured using a crystallization speed analyzer (Model MK-801 manufactured by Kotaki Shoji Co., Ltd. (currently Shimadzu Science West Corporation.)). A foam sheet is defoamed into a film having a thickness of 0.1±0.02 mm. Alternatively, a similar film is prepared in such a manner that no foam is contained. The film is cut into a square of a 15 mm×15 mm size to obtain a sample. The sample is held by a cover glass for a microscope, heated to 200° C. and then placed in a crystallization bath maintained at 110° C. An indicated voltage of 3 V is selected for setting the brightness of the lamp for a light source. The crystallization speed analyzer utilizes a relationship between crystallization and birefringence. Namely, since the birefringence increases as the crystallization proceeds, the change of the quantity of the light transmitted from the sample is monitored by a photoelectric detector. FIG. 8 shows an example of a chart obtained by the analyzer, in which the voltage outputted from the photoelectric detector is plotted as a function of crystallization time until a constant voltage "A" is reached. The point T at which the voltage is A/2 represents the half-crystallization time.

The foamed sheet having $\Delta H_{exo:10}$ of at least 20 J/g and/or the half crystallization of 2 to 200 seconds may be obtained by incorporating thereinto an inorganic nucleating agent such as talc, silica, zeolite, kaolin, montmorillonite, bentonite, clay, magnesium carbonate, aluminum oxide or calcium sulfate, in an amount of 0.05 to 10 parts by weight, preferably 0.1 to 8 parts by weight, particularly preferably 0.1 to less than 4 parts by weight, per 100 parts by weight of the base resin. The nucleating agent is preferably a silicate such as talc or a layered silicate such as montomorillonite. The crystallization speed may be further improved by forming a nanocomposite in which nanoparticles of the nucleating agent are dispersed in the base resin.

If desired, the foamed sheet of the present invention may be formed into a composite sheet in which a thermoplastic resin layer is provided on one or both sides thereof by bonding with an adhesive, by fusion bonding, by coextrusion, by extrusion lamination or any other suitable laminating method. The thermoplastic resin may be, for example, a polyethylene resin, a polypropylene resin, a polyester resin, a polystyrene resin or a polyamide resin. Particularly preferred thermoplastic resin is a biodegradable resin such as a polyester resin containing at least 35 mol % of aliphatic ester monomer units.

The foamed sheet of the present invention is suitably used as a raw material sheet for the production of foam moldings. Thus, the foamed sheet is thermoformed by any suitable known method, such as by vacuum molding, air pressure forming, matched molding or plug assist molding, into open-topped foam receptacles such as trays, cups, mugs, bowls and saucers. The thermoforming temperature is generally 40 to 120° C.

In one preferred embodiment, an open-topped foam receptacle having a draw ratio of S2/S1 where S1 represents an area of the top opening thereof and S2 represents an inside surface area thereof is thermoformed using a foamed sheet having such $\Delta H_x$ ($\Delta H_x = \Delta H_{endo:2} - \Delta H_{exo:2}$) that satisfies the following equation:

$$S2/S1 \leq -0.08 \Delta H_x + 4.2.$$

Namely, depending on the draw ratio of a desired foam molding, the crystallinity of the foamed sheet used as a raw material is determined so as to meet the above condition. By using such a foamed sheet, it is possible to produce foam moldings with good thermoformability within a short molding cycle. When the foamed sheet used does not meet the above condition, the foamed sheet fails to be sufficiently drawn so that the wall thickness of the receptacle becomes non-uniform and cracks are apt to form. More preferably, the foamed sheet satisfies the following equation:

$$S2/S1 \leq -0.07 \Delta H_x + 3.8.$$

The $\Delta H_x$ may be adjusted by controlling the composition of the base resin and by controlling the extrusion molding conditions. More particularly, $\Delta H_{exo:2}$ can be increased by rapidly cooling the extrudate immediately after the extrusion with blowing air or mist, while $\Delta H_{endo:2}$ may be increased by increasing the proportion of crystalline polylactic acid resin in the base resin.

The draw ratio S2/S1 is generally 1.1 to 4.2, preferably 1.1 to 3.4.

The foam molding obtained by thermoforming the foamed sheet is desirably subjected to a heat treatment. Preferably, the foam molding is heated at 80 to 130° C., more preferably 90 to 120° C., for 10 to 60 seconds, so that the crystallization effectively proceeds to improve the heat resistance of the foam molding while preventing reduction of the mechanical strength and deformation of the foam molding.

The heat treatment may be also preferably performed by aging the foam molding at a temperature higher than the glass transition temperature of the polylactic acid resin but not causing deformation thereof, preferably at a temperature of 60 to 80° C., for 6 to 36 hours, so that the crystallization effectively proceeds to improve the heat resistance of the foam molding.

The "glass transition point" as used herein is measured in accordance with JIS K7121-1987 and is calculated from the midpoint of a heat flux of a DSC curve obtained by heat flux differential scanning calorimetry at a heating rate of 10° C./minute. The "glass transition point is measured after the sample has been heat treated under specified conditions" as described in JIS K7121-1987, Paragraph 3, Control of conditions of sample (3). Namely, a sample is placed in a pan of a DSC device and heated to 200° C. at a heating rate of 10° C./minute and maintained at 200° C. for 10 minutes. The melted sample is then cooled to 0° C. at a cooling rate of 10° C./minute. The resulting sample is then subjected to the DSC measurement.

It is preferred that the foam molding of the present invention have a difference ($\Delta H_{endo:Mold} - \Delta H_{exo:Mold}$) between an endothermic calorific value $\Delta H_{endo:Mold}$ and an exothermic calorific value $\Delta H_{exo:Mold}$, as measured by heat flux differential scanning calorimetry at a heating rate of 2° C./min, is not less than 10 J/g, preferably not less than 15 J/g, more preferably not less than 20 J/g, most preferably not less than 25 J/g, for reasons of high degree of crystallization and excellent rigidity and heat resistance. The difference ($\Delta H_{endo:Mold} - \Delta H_{exo:Mold}$) represents a heat required for fusing the crystals contained in the foam molding before the DSC measurement. Thus, the greater the difference, the higher is the degree of crystallization of the foam molding. The upper limit of the difference ($\Delta H_{endo:Mold} - \Delta H_{exo:Mold}$) is not specifically limited but is generally about 60 J/g. The $\Delta H_{exo:Mold}$ of the foam molding can be zero.

The $\Delta H_{endo:Mold}$ and $\Delta H_{exo:Mold}$ of the foam molding may be measured in accordance with JIS K7122-1987. Except that a sample (1-4 mg) is cut out from the foam molding, the DSC measurement is carried out in the same manner as that for the above-described measurement of endothermic calorific value $\Delta H_{endo:2}$ and exothermic calorific value $\Delta H_{exo:2}$ of the foamed sheet.

The foam molding according to the present invention, which is biodegradable in nature, may be suitably used as packaging receptacles such as food receptacles (e.g. lunch trays, noodle bowls, fruit and vegetable containers, etc.) and cushion receptacles for various articles such as electrical appliances and precision instruments.

The following examples and comparative examples will further illustrate the present invention. Parts and percentages are by weight except otherwise specifically noted.

Resins A to E used in Examples and Comparative Examples as raw material resins for foamed sheets are as shown in Table 1 below. Resins A to D were prepared as follows. To a two-axis extruder, 100 parts of crystalline polylactic acid resin (Trade name: H-100, manufactured by Mitsui Chemical Corporation, density: 1,260 kg/m³, endothermic calorific value $\Delta H_{endo:Material}$: 49 J/g) and dicumyl peroxide (DCP) in an amount shown in Table 1 were fed. The mixture was heated to melt the resin and kneaded. The melt was adjusted to a temperature of 215° C. and extruded in the form of strands. The strands were immersed into water at about 25° C. and cut into pellets, thereby obtaining Resins A to D. The crystalline polylactic acid resin H-100 was used Resin E as such. The melt tensions and half crystallization times of Resins A to E are shown in Table 1.

TABLE 1

| Raw material resin | | Resin A | Resin B | Resin C | Resin D | Resin E |
|---|---|---|---|---|---|---|
| Polylactic acid resin | | H-100 | H-100 | H-100 | H-100 | H-100 |
| Peroxide | Kind | DCP | DCP | DCP | DCP | — |
| | Amount (parts) | 0.4 | 0.35 | 0.45 | 0.6 | — |
| Melt tension (cN) | | 16 | 13 | 20 | 27 | 0.4 |
| Half crystallization time (sec) | | 109 | 122 | 97 | 73 | 1097 |

EXAMPLE 1

Two, first and second extruders having inside diameters of 90 mm and 120 mm were connected in tandem and used for the preparation of a foamed sheet. Thus, Resin A and the cell controlling agent shown in Table 2 are fed to the first extruder in the amounts shown in Table 2 and heated and kneaded to obtain a melt. The melt was in the first extruder was kneaded with the blowing agent shown in Table 2 in the amount shown in Table 2. The resulting kneaded mass was then fed to the second extruder and cooled therein to 171° C. and extruded through a circular die having a diameter of 110 mm and a lip clearance of 0.5 mm to obtain a tubular extrudate. The tubular extrudate was hauled, while being cooled, and longitudinally (in the extrusion direction) cut and opened to obtain a foamed sheet. The cooling of the tubular extrudate was carried out by blowing air on the inside surface of the tubular extrudate immediately after extrusion at a rate of 0.4 m³/min (23° C., 1 atm) while blowing air around the outside thereof at a rate of 0.9 m³/min (23° C., 1 atm) and by sliding the tubular extrudate over a mandrel (adjusted to 5° C. and having a diameter of 333 mm) of a cooling device.

EXAMPLE 2

A foamed sheet was prepared in the same manner as described in Example 1 except that the kind and amount of the blowing agent and the amount of the cell controlling agent were changed as shown in Table 2 and that the kneaded mass was cooled to 172° C. in the second extruder and extruded through a circular die having a diameter of 135 mm and a lip clearance of 0.5 mm.

EXAMPLE 3

A foamed sheet was prepared in the same manner as described in Example 1 except that Resin C was used in place of Resin A, that the kind and amount of the blowing agent were changed as shown in Table 2 and that the kneaded mass was cooled to 167° C. in the second extruder and extruded through a circular die having a diameter of 90 mm and a lip clearance of 0.5 mm.

EXAMPLE 4

A foamed sheet was prepared in the same manner as described in Example 1 except that Resin E was used in place of Resin A, that the kinds and amounts of the blowing agent and the cell controlling agent were changed as shown in Table 2 and that the kneaded mass was cooled to 183° C. in the second extruder and extruded through a circular die having a diameter of 135 mm and a lip clearance of 0.5 mm.

EXAMPLE 5

A foamed sheet was prepared in the same manner as described in Example 1 except that Resin B was used in place of Resin A, that the kind and amount of the blowing agent were changed as shown in Table 2 and that the kneaded mass was cooled to 180° C. in the second extruder and extruded through a circular die having a diameter of 135 mm and a lip clearance of 0.5 mm.

EXAMPLE 6

A foamed sheet was prepared in the same manner as described in Example 1 except that Resin E was used in place of Resin A, that 0.4 part of DCP per 100 parts of Resin E was fed together with Resin E to the first extruder, that the kind and amount of the blowing agent and the amount of the cell controlling agent were changed as shown in Table 2 and that the kneaded mass was cooled to 170° C. in the second extruder and extruded through a circular die having a diameter of 135 mm and a lip clearance of 0.5 mm.

EXAMPLE 7

A foamed sheet was prepared in the same manner as described in Example 1 except that the kind and amount of the blowing agent and the amount of the cell controlling agent were changed as shown in Table 2 and that the kneaded mass was cooled to 170° C. in the second extruder and extruded through a circular die having a diameter of 135 mm and a lip clearance of 0.5 mm.

EXAMPLE 8

A foamed sheet was prepared in the same manner as described in Example 1 except that Resin D was used in place of Resin A, that the kind and amount of the blowing agent and the amount of the cell controlling agent were changed as shown in Table 2 and that the kneaded mass was cooled to 170° C. in the second extruder and extruded through a circular die having a diameter of 135 mm and a lip clearance of 0.5 mm.

EXAMPLE 9

A foamed sheet was prepared in the same manner as described in Example 1 except that the amount of the blowing agent was changed as shown in Table 3 and that the kneaded mass was cooled to 174° C. in the second extruder and extruded through a circular die having a diameter of 135 mm and a lip clearance of 0.5 mm.

EXAMPLE 10

A foamed sheet was prepared in the same manner as described in Example 1 except that Resin C was used in place of Resin A, that the kind and amount of the blowing agent and the amount of the cell controlling agent were changed as shown in Table 3 and that the kneaded mass was cooled to 167° C. in the second extruder and extruded through a circular die having a diameter of 90 mm and a lip clearance of 0.5 mm.

EXAMPLE 11

A foamed sheet was prepared in the same manner as described in Example 1 except that Resin C was used in place of Resin A, that the kind and amount of the blowing agent and the amount of the cell controlling agent were changed as shown in Table 3 and that the kneaded mass was cooled to 181° C. in the second extruder and extruded through a circular die having a diameter of 135 mm and a lip clearance of 0.5 mm.

Each of the foamed sheets obtained in Examples 1-11 was measured or tested for apparent density, thickness, closed cell content, cell geometry (Z, Z/X and Z/Y), exothermic calorific value at a heating rate of 2° C./min ($\Delta H_{exo:2}$), endothermic calorific value at a heating rate of 2° C./min ($\Delta H_{endo:2}$), difference ($\Delta H_x$) between $\Delta H_{exo:2}$ and $\Delta H_{endo:2}$ ($\Delta H_x = \Delta H_{endo:2} - \Delta H_{exo:2}$), exothermic calorific value ($\Delta H_{exo:10}$) at a cooling rate of 10° C./min, half crystallization time, melt tension, heat sag, moldability, appearance and ability to improve heat resistance. The results are shown in Table 2 and Table 3.

In the measurement the average cell diameters X (in the extrusion direction) and Z (in the thickness direction), the foamed sheet was cut along the centerline in the extrusion direction thereof so as to divide the sheet in equal halves.

The DSC analysis for the measurement of the exothermic and endothermic calorific value was carried out using Shimadzu Heat Flux Differential Scanning Calorimeter DSC-50 (manufactured by SHIMADZU corporation) and a data analyzing software (Partial Area Analyzing Program version 1.52 for Shimadzu Thermoanalysis Work Station TA-60WS).

TABLE 2

| | | Example No. | | | | | | | |
|---|---|---|---|---|---|---|---|---|---|
| | | 1 | 2 | 3 | 4 | 5 | 6 | 7 | 8 |
| Raw material resin | | Resin A | Resin A | Resin C | Resin E | Resin B | Resin E | Resin A | Resin D |
| Kind and proportion of blowing agent components (mol %) | n-butane | 35 | 70 | — | 30 | — | 70 | 70 | 70 |
| | isobutane | 65 | 30 | 100 | 70 | — | 30 | 30 | 30 |
| | $CO_2$ | — | — | — | — | 100 | — | — | — |
| Amount of blowing agent (%) | | 2.3 | 2.5 | 4.0 | 1.0 | 0.8 | 2.5 | 2.5 | 2.5 |
| Cell controlling agent | | talc | talc | talc | citric acid | talc | talc | talc | talc |
| Amount of cell controlling agent (part per 100 parts of the raw material resin) | | 0.1 | 3.0 | 0.1 | 0.5 | 0.1 | 2.0 | 1.2 | 3.0 |
| Apparent density (kg/m$^3$) | | 180 | 250 | 97 | 573 | 420 | 250 | 200 | 263 |
| Thickness (mm) | | 1.4 | 1.3 | 2.0 | 0.6 | 1.0 | 1.3 | 1.5 | 1.3 |
| Closed cell content (%) | | 87 | 82 | 85 | 15 | 85 | 84 | 87 | 88 |
| Z (mm) | | 0.50 | 0.15 | 0.16 | 0.20 | 0.10 | 0.20 | 0.47 | 0.18 |
| Z/X | | 0.63 | 0.41 | 0.69 | 0.58 | 0.30 | 0.50 | 0.60 | 0.50 |

TABLE 2-continued

| | Example No. | | | | | | | |
|---|---|---|---|---|---|---|---|---|
| | 1 | 2 | 3 | 4 | 5 | 6 | 7 | 8 |
| Z/Y | 0.58 | 0.39 | 0.53 | 0.43 | 0.26 | 0.43 | 0.55 | 0.45 |
| $\Delta H_{exo:2}$ (J/g) | 36.0 | 29.2 | 36.0 | 33.2 | 36.3 | 27.3 | 27.4 | 17.8 |
| $\Delta H_{endo:2}$ (J/g) | 39.0 | 37.0 | 39.5 | 33.9 | 38.7 | 34.5 | 34.3 | 33.2 |
| $\Delta H_x$ (J/g) | 3.0 | 7.8 | 3.5 | 0.7 | 2.4 | 7.2 | 6.9 | 15.4 |
| $\Delta H_{exo:10}$ (J/g) | 33.0 | 36.9 | 33.0 | 1.0 | 33.0 | 37.0 | 33.4 | 34.0 |
| Half crystallization time (sec) | 109 | 69 | 97 | 1097 | 120 | 72 | 79 | 60 |
| Melt tension (cN) | 16 | 16 | 20 | 0.4 | 13 | 15 | 16 | 27 |
| Heat sag (mm) | over 30 | 25 | over 30 | over 30 | over 30 | 25 | 25 | 15 |
| Draw ratio (S1/S2) | 2.29 | 2.29 | 2.29 | 2.29 | 2.29 | 2.29 | 2.29 | 2.29 |
| $-0.08 \times \Delta H_x + 4.2$ | 3.96 | 3.58 | 3.92 | 4.14 | 4.01 | 3.62 | 3.65 | 2.96 |
| Moldability | A | A | A | A | A | A | A | A |
| Appearance | A | A | A | A | A | A | A | A |
| Ability to improve heat resistance | B | B | B | C | B | B | B | B |

TABLE 3

| | | Example No. | | |
|---|---|---|---|---|
| | | 9 | 10 | 11 |
| Raw material resin | | Resin A | Resin C | Resin C |
| Kind and proportion of blowing agent components (mol %) | n-butane | 35 | — | — |
| | isobutane | 65 | 100 | — |
| | $CO_2$ | — | — | 100 |
| Amount of blowing agent (%) | | 1.8 | 4.5 | 0.6 |
| Cell controlling agent | | talc | talc | talc |
| Amount of cell controlling agent (part per 100 parts of the raw material resin | | 0.1 | 0.05 | 0.50 |
| Apparent density (kg/m³) | | 252 | 105 | 573 |
| Thickness (mm) | | 2.0 | 8 | 1.0 |
| Closed cell content (%) | | 85 | 86 | 20 |
| Z (mm) | | 0.20 | 2.5 | 0.03 |
| Z/X | | 0.97 | 0.72 | 0.75 |
| Z/Y | | 0.95 | 0.66 | 0.67 |
| $\Delta H_{exo:2}$ (J/g) | | 36.1 | 34.7 | 35.9 |
| $\Delta H_{endo:2}$ (J/g) | | 39.1 | 36.4 | 37.9 |
| $\Delta H_x$ (J/g) | | 3.0 | 1.7 | 2.0 |
| $\Delta H_{exo:10}$ (J/g) | | 33.0 | 33.0 | 33.0 |
| Half crystallization time (sec) | | 107 | 140 | 130 |
| Melt tension (cN) | | 16 | 12 | 12 |
| Heat sag (mm) | | over 30 | over 30 | over 30 |
| Draw ratio (S1/S2) | | 2.29 | 2.29 | 2.29 |
| $-0.08 \times \Delta H_x + 4.2$ | | 3.96 | 4.06 | 4.04 |
| Moldability | | B | A | B |
| Appearance | | A | B | A |
| Ability to improve heat resistance | | B | B | B |

The moldability, appearance and ability to improve heat resistance shown in Tables 2 and 3 are evaluated as follows.

Moldability:

A foamed sheet is subjected to a thermoforming test using a vacuum forming machine (Model FKS manufacture by Asano Laboratories Co., Ltd.). All four side edges of the foamed sheet are clamped at all its four side edges and both surfaces thereof are heated with a heater to 40° C. Then the foamed sheet is shaped in a mold into a cup in the shape of an inverted circular truncated cone having a top diameter of 125 mm, a bottom diameter of 110 mm and a depth of 50 mm (draw ratio: 2.29). From the state of the molded cup obtained, the moldability is evaluated according to the following ratings:

A: The cup has uniform thickness and has no cracks in the interior and exterior surfaces thereof.

B: The cup has slight variation in its thickness but has no cracks in the interior and exterior surfaces thereof.

C: Cracks are formed in the interior and/or exterior surface thereof.

Appearance:

A foamed sheet is observed with naked eyes. The appearance is evaluated according to the following ratings:

A: The sheet has uniform surface gloss.

B: Cells are noticeably seen on the surface of the sheet.

Ability to Improve Heat Resistance:

From the exothermic calorific value $\Delta H_{exo:10}$, endothermic calorific value $\Delta H_{endo:2}$ and difference $\Delta H_x$ ($\Delta H_x = \Delta H_{endo:2} - \Delta H_{exo:2}$), evaluation is made according to the following ratings:

A: $\Delta H_{exo:10} \geq 20$ J/g, $\Delta H_{endo:2} \geq 20$ J/g and 40 J/g > $\Delta H_x \geq 20$ J/g.

B: $\Delta H_{exo:10} \geq 20$ J/g, $\Delta H_{endo:2} \geq 20$ J/g and $\Delta H_x < 20$ J/g.

C: $\Delta H_{exo:10} < 20$ J/g, $\Delta H_{endo:2} \geq 20$ J/g and $\Delta H_x < 20$ J/g.

D: $\Delta H_{exo:10} < 20$ J/g, $\Delta H_{endo:2} < 20$ J/g and $\Delta H_x < 20$ J/g.

EXAMPLE 12

The foamed sheet obtained in Example 1 was thermoformed using a vacuum forming machine (Model FKS manufacture by Asano Laboratories Co., Ltd.). All four side edges of the foamed sheet were clamped at all its four side edges and both surfaces thereof were heated with a heater to 40° C. Then the foamed sheet was shaped in a mold into a cup in the shape of an inverted circular truncated cone having a top diameter of 125 mm, a bottom diameter of 110 mm and a depth of 50 mm (draw ratio: 2.29). The resulting molded cup was then heat treated by being held at 90° C. in the mold for 30 seconds.

EXAMPLE 13

Example 12 was repeated in the same manner as described except that the foamed sheet obtained in Example 2 was used and that the heat treatment was performed at 110° C. for 30 seconds.

EXAMPLE 14

Example 12 was repeated in the same manner as described except that the foamed sheet obtained in Example 6 was used.

EXAMPLE 15

Example 12 was repeated in the same manner as described except that the foamed sheet obtained in Example 8 was used and that the heat treatment was performed at 90° C. for 15 seconds.

EXAMPLE 16

Example 12 was repeated in the same manner as described except that the foamed sheet obtained in Example 8 was used.

COMPARATIVE EXAMPLE 1

Example 12 was repeated in the same manner as described except no heat treatment was performed.

Each of the molded cups obtained in Examples 12-16 and Comparative Example 1 was measured or tested for exothermic calorific value $\Delta H_{exo:Mold}$, endothermic calorific value $\Delta H_{endo:Mold}$, difference ($\Delta H_{endo:Mold} - \Delta H_{exo:Mold}$) and heat resistance. The results are shown in Table 4.

TABLE 4

| | Example No. | | | | | |
|---|---|---|---|---|---|---|
| | 12 | 13 | 14 | 15 | 16 | |
| Comparative Example No. | | | | | | 1 |
| Foamed sheet | Example 1 | Example 2 | Example 6 | Example 8 | Example 8 | Example 1 |
| Molded product | cup | cup | cup | cup | cup | cup |
| $\Delta H_{exo:Mold}$(J/g) | 20.7 | 0 | 7.0 | 11.7 | 1.2 | 29.8 |
| $\Delta H_{endo:Mold}$(J/g) | 41.9 | 42.9 | 35.2 | 33.8 | 33.8 | 34.8 |
| $\Delta H_{endo:Mold}$ - $\Delta H_{exo:Mold}$(J/g) | 21.2 | 42.9 | 28.2 | 22.1 | 32.6 | 5.0 |
| $\Delta$Heat treatment temperature | 90° C. | 110° C. | 90° C. | 90° C. | 90° C. | — |
| Heat treatment time | 30 sec | 30 sec | 30 sec | 15 sec | 30 sec | — |
| Heat resistance | B | A | A | B | A | C |

The heat resistance in Table 4 was tested by heating a molded cup specimen at 70° C. and 90° C. in an oven for 5 minutes. Whether or not deformation of the specimen occurred was determined. The heat resistance was evaluated according to the following ratings:

A: No deformation by heating at 90° C.

B: No deformation by heating at 70° C. but significant deformation by heating at 90° C.

C: Significant deformation by heating at 70° C.

EXAMPLE 17

A foamed sheet was prepared in the same manner as described in Example 1 except that Resin D was used in place of Resin A and that the kind and amount of the blowing agent and the amount of the cell controlling agent were changed as shown in Table 5. The foamed sheet thus obtained was thermoformed using a vacuum forming machine (Model FKS manufacture by Asano Laboratories Co., Ltd.). All four side edges of the foamed sheet were clamped at all its four side edges and both surfaces thereof were heated with a heater to 70° C. The thus obtained foamed sheet was shaped in a mold into a cup in the shape of an inverted circular truncated cone having a top diameter of 165 mm, a bottom diameter of 110 mm and a depth of 50 mm (draw ratio: 1.60). The resulting molded cup was then heat treated by being held at 110° C. in the mold for 15 seconds.

When the above foamed sheet was subjected to deep drawing by shaping in a mold adapted to form a cup in the shape of an inverted circular truncated cone having a top diameter of 130 mm, a bottom diameter of 90 mm and a depth of 105 mm (draw ratio: 3.26), it was not possible to obtain such a cup.

EXAMPLE 18

A foamed sheet was obtained in the same manner as that in Example 17 except that the kinds of the blowing agent and the amount of the cell controlling agent were changed as shown in Table 5 and that flow rate of air blown around the outside of the tubular extrudate immediately after the extrusion was at a rate of 1.2 m³/min (23° C., 1 atm). The thus obtained foamed sheet was shaped in a mold into a cup in the shape of an inverted circular truncated cone having a top diameter of 130 mm, a bottom diameter of 100 mm and a depth of 70 mm (draw ratio: 2.54). The resulting molded cup was then heat treated by being held at 110° C. in the mold for 30 seconds.

When the above foamed sheet was subjected to deep drawing by shaping in a mold adapted to form a cup in the shape of an inverted circular truncated cone having a top diameter of 130 mm, a bottom diameter of 90 mm and a depth of 105 mm (draw ratio: 3.26), it was not possible to obtain such a cup.

EXAMPLE 19

A foamed sheet was obtained in the same manner as that in Example 17 except that Resin A was used in place of Resin D, that the amount of the cell controlling agent was changed as shown in Table 5 and that the kneaded mass was cooled to 169° C. in the second extruder and extruded through a circular die having a diameter of 90 mm and a lip clearance of 0.5 mm. The thus obtained foamed sheet was shaped in a mold into a cup in the shape of an inverted circular truncated cone having a top diameter of 130 mm, a bottom diameter of 90 mm and a depth of 105 mm (draw ratio: 3.26). The resulting molded cup was then heat treated by being held at 110° C. in the mold for 30 seconds.

EXAMPLE 20

A foamed sheet was obtained in the same manner as that in Example 17 except that the amount of the blowing agent and the amount of the cell controlling agent were changed as shown in Table 5, that the kneaded mass was cooled to 174° C. in the second extruder and extruded through a circular die having a diameter of 135 mm and a lip clearance of 0.5 mm and that the flow rate of air blown around the outside of the tubular extrudate immediately after the extrusion was at a rate of 0.6 m³/min (23° C., 1 atm). The thus obtained foamed sheet was shaped in a mold into a cup in the shape of an inverted circular truncated cone having a top diameter of 180 mm, a bottom diameter of 130 mm and a depth of 25 mm (draw ratio: 1.20). The resulting molded cup was then heat treated in the same manner as described in Example 17.

When the above foamed sheet was subjected to deep drawing by shaping in a mold adapted to form a cup in the shape of an inverted circular truncated cone having a top diameter of 125 mm, a bottom diameter of 110 mm and a depth of 50 mm (draw ratio: 2.30), it was not possible to obtain such a cup.

EXAMPLE 21

A foamed sheet was obtained in the same manner as that in Example 17 except that Resin E was used in place of Resin D, that 0.4 part of DCP per 100 parts of Resin E was fed together with Resin E to the first extruder, that the kind and the amount of the blowing agent and the amount of the cell controlling agent were changed as shown in Table 5 and that the kneaded mass was cooled to 175° C. in the second extruder and extruded through a circular die having a diameter of 135 mm and a lip clearance of 0.5 mm. The thus obtained foamed sheet was shaped in a mold into a cup in the shape of an inverted circular truncated cone having a top diameter of 130 mm, a bottom diameter of 100 mm and a depth of 70 mm (draw ratio: 2.54). The resulting molded cup was then heat treated by being held at 110° C. in the mold for 60 seconds.

EXAMPLE 22

A foamed sheet was obtained in the same manner as that in Example 17 except that the kind and the amount of the blowing agent and the amount of the cell controlling agent were changed as shown in Table 5 and that the flow rate of air blown around the outside of the tubular extrudate immediately after the extrusion was at a rate of 0.6 m³/min (23° C., 1 atm). Then, in the same manner as described in Example 17, the foamed sheet was shaped into a cup and the cup was heat treated.

COMPARATIVE EXAMPLE 2

In this example, a mixed resin composed of 25% of Resin D and 75% of Resin F was used as a raw material resin. Resin F is a non-crystalline polylactic acid resin (trade name: H-280, manufactured by Mitsui Chemical Corporation) having a melt tension of 1.6 cN. The mixed resin had a melt tension of 9 cN. A foamed sheet was obtained in the same manner as that in Example 17 except that the mixed resin was used in place of Resin D and that the amount of the cell controlling agent was changed as shown in Table 5. The thus obtained foamed sheet was shaped in a mold into a cup in the shape of an inverted circular truncated cone having a top diameter of 130 mm, a bottom diameter of 90 mm and a depth of 105 mm (draw ratio: 3.26). The resulting molded cup was then heat treated by being held at 110° C. in the mold for 600 seconds.

Each of the foamed sheets obtained in Examples 17-22 and Comparative Example 2 was measured or tested for apparent density, thickness, closed cell content, cell geometry (Z, Z/X and Z/Y), exothermic calorific value at a heating rate of 2° C./min ($\Delta H_{exo:2}$), endothermic calorific value at a heating rate of 2° C./min ($\Delta H_{endo:2}$), difference ($\Delta H_x$) between $\Delta H_{exo:2}$ and $\Delta H_{endo:2}$ ($\Delta H_x = \Delta H_{endo:2} - \Delta H_{exo:2}$), exothermic calorific value ($\Delta H_{exo:10}$) at a cooling rate of 10° C./min, melt tension of foam molding, moldability, appearance, ability to improve heat resistance, and heat resistance. The results are shown in Table 5.

TABLE 5

| | | | Example No. | | | | | |
| --- | --- | --- | --- | --- | --- | --- | --- | --- |
| | | | 17 | 18 | 19 | 20 | 21 | 22 |
| Comparative Example No. | | | | | | | | 2 |
| Raw material resin | | | Resin D | Resin D | Resin A | Resin D | Resin E | Resin D | Resins D&F |
| Kind and proportion of | n-butane | | 70 | — | 70 | 70 | — | 35 | 70 |
| blowing agent | isobutane | | 30 | 100 | 30 | 30 | — | 65 | 30 |
| components (mol %) | $CO_2$ | | — | — | — | — | 100 | — | — |
| Amount of blowing agent (%) | | | 2.5 | 2.5 | 2.5 | 1.2 | 0.8 | 2.2 | 2.5 |
| Cell controlling agent | | | talc | talc | talc | talc | talc | talc | talc |
| Amount of cell controlling agent (part per 100 parts of the raw material resin) | | | 4.5 | 5.0 | 1.2 | 5.0 | 0.1 | 10 | 3.0 |
| Apparent density (kg/m³) | | | 263 | 263 | 200 | 504 | 420 | 263 | 263 |
| Thickness (mm) | | | 1.5 | 1.5 | 1.5 | 0.8 | 1.0 | 1.4 | 1.3 |
| Closed cell content (%) | | | 88 | 87 | 87 | 85 | 85 | 28 | 88 |
| Z (mm) | | | 0.12 | 0.10 | 0.47 | 0.07 | 0.10 | 0.07 | 0.18 |
| Z/X | | | 0.50 | 0.40 | 0.60 | 0.40 | 0.30 | 0.40 | 0.41 |
| Z/Y | | | 0.45 | 0.40 | 0.55 | 0.40 | 0.26 | 0.38 | 0.39 |
| $\Delta H_{exo:2}$ (J/g) | | | 11.8 | 19.2 | 27.4 | 5.0 | 36.3 | 5.5 | 8.5 |
| $\Delta H_{endo:2}$ (J/g) | | | 33.2 | 34.9 | 34.3 | 34.8 | 38.7 | 31.8 | 9.0 |
| $\Delta H_x$ (J/g) | | | 21.4 | 15.7 | 6.9 | 29.8 | 2.4 | 26.3 | 0.5 |
| $\Delta H_{exo:10}$ (J/g) | | | 32.3 | 34.2 | 33.4 | 33.9 | 33.0 | 31.5 | 8.2 |
| Melt tension of foam molding (cN) | | | 9 | 9 | 7 | 9 | 6 | 9 | 3 |
| $-0.08 \times \Delta H_x + 4.2$ | | | 2.49 | 2.94 | 3.65 | 1.82 | 4.01 | 2.10 | 4.16 |
| Draw ratio (S1/S2) | | | 1.60 | 2.54 | 3.26 | 1.20 | 2.54 | 1.60 | 3.26 |
| Moldability | | | A | A | A | A | A | A | A |
| Heat treatment | temperature (° C.) | | 110 | 110 | 110 | 110 | 110 | 110 | 110 |
| conditions | time (sec) | | 15 | 30 | 30 | 15 | 60 | 15 | 600 |
| Appearance | | | A | A | A | A | A | A | A |
| Ability to improve heat resistance | | | A | B | B | A | B | A | D |
| Heat resistance of foamed cup | | | A | A | A | A | A | A | C |

The moldability in Table 5 was evaluated according to the following ratings:

A: The cup has uniform thickness and has no cracks in the interior and exterior surfaces thereof.

B: The cup has slight variation in its thickness but has no cracks in the interior and exterior surfaces thereof.

C: Cracks are formed in the interior and/or exterior surface thereof.

The heat resistance of cup in Table 5 was tested in the same manner as that in Table 4. The appearance and ability to improve heat resistance were tested in the same manner as that in Table 2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. An extruded foamed sheet of a base resin comprising at least 50% by weight of a polylactic acid resin modified to give said extruded foamed sheet a half crystallization time of 2 to 200 seconds at 110° C., said foamed sheet having an apparent density of 63 to 630 kg/m$^3$, a thickness of 0.5 to 7 mm and endothermic and exothermic calorific values of $\Delta H_{endo:2}$ and $\Delta H_{exo:2}$, respectively, as measured by heat flux differential scanning calorimetry at a heating rate of 2° C./min, wherein the endothermic calorific value $\Delta H_{endo:2}$ is at least 10 J/g and the difference ($\Delta H_{endo:2} - \Delta H_{exo:2}$) between the endothermic calorific value $\Delta H_{endo:2}$ and the exothermic calorific value $\Delta H_{exo:2}$ is less than 20 J/g.

2. An extruded foamed sheet as claimed in claim 1, wherein the extruded foamed sheet has an exothermic calorific value $\Delta H_{exo:10}$, as measured by heat flux differential scanning calorimetry at a cooling rate of 10° C./min, of at least 20 J/g.

3. An extruded foamed sheet as claimed in claim 1, wherein the extruded foamed sheet has a melt tension of at least 5 cN at 190° C.

4. An extruded foamed sheet as claimed in claim 1, wherein the extruded foamed sheet has cells having an average cell diameter in the extrusion direction of X mm, an average cell diameter in the transverse direction of Y mm and an average cell diameter in the thickness direction of Z mm, and wherein X, Y and Z satisfy the following conditions:

0.05 mm>Z>0.8 mm 0.2>Z/X>0.8

0.2>Z/Y>0.65.

5. A foam molding obtained by thermoforming an extruded foamed sheet of a base resin containing at least 50% by weight of a polylactic acid resin modified to give said extruded foamed sheet a half crystallization time of 2 to 200 seconds at 110° C., said foam molding having endothermic and exothermic calorific values of $\Delta H_{endo:Mold}$ and $\Delta H_{exo:Mold}$, respectively, as measured by heat flux differential scanning calorimetry at a heating rate of 2° C./min, wherein the difference ($\Delta H_{endo:Mold} - \Delta H_{exo:Mold}$) between the endothermic calorific value $\Delta H_{endo:Mold}$ and the exothermic calorific value $\Delta H_{exo:Mold}$ is not less than 10 J/g.

6. An extruded foamed sheet as claimed in claim 1, wherein the endothermic and calorific value $\Delta H_{endo:2}$ is at least 20 J/g.

7. An extruded foamed sheet as claimed in claim 1 having a half crystallization time of 20-200 seconds at 110° C.

8. An extruded foamed sheet as claimed in claim 1 wherein the polylactic acid resin has been modified by reaction with an organic peroxide, an isocyanate, an epoxy compound, a metal complex, a polyvalent carboxylic acid or a mixture thereof.

9. An extruded foamed sheet as claimed in claim 1 wherein the polylactic acid resin has been reacted with an organic peroxide.

10. An extruded foamed sheet as claimed in claim 1 wherein the polylactic acid resin has an endothermic calorific value $\Delta H_{endo:Material}$ of at least 10 J/g as measured by heat flux differential scanning calorimetry at a heating rate of 2° C./min.

11. An extruded foamed sheet as claimed in claim 9 wherein the organic peroxide is dicumyl peroxide.

12. A foam molding as claimed in claim 5 wherein the polylactic acid resin has been modified by reaction with an organic peroxide, an isocyanate, an epoxy compound, a metal complex, a polyvalent carboxylic acid or a mixture thereof.

13. A foam molding as claimed in claim 5 wherein the polylactic acid resin has been reacted with an organic peroxide.

* * * * *

UNITED STATES PATENT AND TRADEMARK OFFICE
CERTIFICATE OF CORRECTION

PATENT NO. : 7,645,810 B2
APPLICATION NO. : 11/305045
DATED : January 12, 2010
INVENTOR(S) : Kenichi Takase et al.

It is certified that error appears in the above-identified patent and that said Letters Patent is hereby corrected as shown below:

Column 26, Line 1 (claim 4, line 7), delete "$0.05\ mm > Z > 0.8mm$"; add "$0.05\ mm < Z < 0.8mm$".

Column 26, Line 3 (claim 4, line 9), delete "$0.2 > Z/X > 0.8$"; add "$0.2 < Z/X < 0.8$".

Column 26, Line 5 (claim 4, line 11), delete "$0.2 > Z/Y > 0.65$"; add "$0.2 < Z/Y < 0.65$".

Signed and Sealed this

Second Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,645,810 B2  Page 1 of 1
APPLICATION NO. : 11/305045
DATED : January 12, 2010
INVENTOR(S) : Takase et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 873 days.

Signed and Sealed this

Twenty-eighth Day of December, 2010

David J. Kappos
*Director of the United States Patent and Trademark Office*